(12) United States Patent
Matsumoto et al.

(10) Patent No.: US 7,492,693 B2
(45) Date of Patent: Feb. 17, 2009

(54) OPTICAL RECORDING/REPRODUCING APPARATUS WITH TRANSMISSION AMOUNT VARIATION UNIT

(75) Inventors: Toshio Matsumoto, Kyoto (JP); Takeharu Yamamoto, Takatsuki (JP); Hisashi Senga, Kadoma (JP)

(73) Assignee: Panasonic Corporation, Osaka (JP)

( * ) Notice: Subject to any disclaimer, the term of this patent is extended or adjusted under 35 U.S.C. 154(b) by 647 days.

(21) Appl. No.: 11/188,059

(22) Filed: Jul. 22, 2005

(65) Prior Publication Data

US 2006/0018236 A1 Jan. 26, 2006

(30) Foreign Application Priority Data

Jul. 23, 2004 (JP) ............................... 2004-216213

(51) Int. Cl.
*G11B 7/00* (2006.01)

(52) U.S. Cl. ................................ 369/112.22; 369/53.25

(58) Field of Classification Search ........................ None
See application file for complete search history.

(56) References Cited

U.S. PATENT DOCUMENTS

| 2002/0141321 A1 | 10/2002 | Wada et al. |
| 2004/0022152 A1 | 2/2004 | Hayashi |
| 2006/0198276 A1* | 9/2006 | Nishi et al. ............. 369/112.02 |

FOREIGN PATENT DOCUMENTS

| DE | 196 50 027 | 6/1998 |
| EP | 1 460 624 | 9/2004 |
| JP | 6-131683 | 5/1994 |
| JP | 2000-195086 | 7/2000 |
| JP | 2003-115109 | 4/2003 |
| WO | 03/049096 | 6/2003 |

* cited by examiner

*Primary Examiner*—Paul Huber
(74) *Attorney, Agent, or Firm*—Hamre, Schumann, Mueller & Larson, P.C.

(57) ABSTRACT

When a light-receiving element receives a first laser beam, an output power detection unit detects a differential quantum efficiency value of the first laser beam. A control unit judges whether or not an intensity filter and a filter driving unit are operated in accordance with a control signal output from the control unit by using the differential quantum efficiency value from the output power detection unit.

15 Claims, 19 Drawing Sheets

OPTICAL RECORDING/REPRODUCING APPARATUS WITH TRANSMISSION AMOUNT VARIATION UNIT

BACKGROUND OF THE INVENTION

1. Field of the Invention

The present invention relates to an optical recording/reproducing apparatus for recording or reproducing information on/from a recording medium.

2. Description of Related Art

Conventionally, a number of optical recording/reproducing apparatuses using a semiconductor laser have been developed. Among them, an optical recording/reproducing apparatus using an optical disk as a recording medium is receiving attention because a further increase in capacity and speed can be expected. Such an optical recording/reproducing apparatus emits a laser beam onto a surface of an optical disk so as to form a smaller spot, whereby the recording density of the optical disk is increased and a higher capacity can be achieved. Examples of an optical recording/reproducing apparatus using such a technique include an optical recording/reproducing apparatus that uses a Blu-Ray Disc as an optical disk and uses a semiconductor laser as a light source that emits a blue-violet laser beam having a wavelength in the vicinity of 405 nm to the optical disk, and such an optical recording/reproducing apparatus is being developed actively.

However, when information on an optical disk is reproduced by using a laser beam having a short wavelength in the vicinity of 405 nm as above, a smaller spot formed on a surface of the optical disk receives a higher irradiation energy. Therefore, problems may arise that the optical disk is deteriorated due to a rise in temperature, that recorded information is erased, and the like. To solve these problems, when the output power of a semiconductor laser is reduced so as to reduce the irradiation energy on a spot on the surface of the optical disk, then another problem arises that the signal-to-noise ratio (S/N) is degraded due to the quantum noise of the semiconductor laser itself.

As a solution to the above-mentioned problems, JP 2000-195086 A, for example, describes an optical recording/reproducing apparatus as a first conventional example in which an intensity filter is inserted between a semiconductor laser and an optical disk, so that the intensity (irradiation energy) of a laser beam on a surface of the optical disk is attenuated without a reduction in the output power of the semiconductor laser.

However, the optical recording/reproducing apparatus according to the first conventional example cannot record/reproduce information on/from both a recording medium having a single recording layer and a recording medium having a plurality of recording layers. In order to solve this problem, an optical recording/reproducing apparatus is proposed that changes the transmittance of an intensity filter so as to record/reproduce information also on/from a recording medium having a plurality of recording layers (see, for example, JP 2003-115109 A).

The optical recording/reproducing apparatus described in JP 2003-115109 A will be described as a second conventional example. FIG. 18 is a block diagram showing a configuration of the optical recording/reproducing apparatus according to the second conventional example.

As shown in FIG. 18, the optical recording/reproducing apparatus according to the second conventional example includes an optical head 120, a filter driving unit 130, a laser power control unit 131, an output power detection unit 132, a focus control unit 133, a tracking control unit 134, a reproduction signal processing unit 135, a medium judgment unit 136, and a control unit 137. The optical head 120 includes a semiconductor laser 101, a collimator lens 102, an intensity filter 103, a beam splitter 104, a quarter-wave plate 105, an objective lens 106, detection lenses 108 and 110, and light-receiving elements 109 and 111.

In the optical recording/reproducing apparatus according to the second conventional example, the filter driving unit 130 inserts or removes the intensity filter 103 in/from a path (hereinafter, referred to as an optical path) of a laser beam emitted from the semiconductor laser 101 in accordance with the number of recording layers of the optical disk 107, which is judged by the medium judgment unit 136. In other words, the arrangement of the intensity filter 103 in the optical path is changed depending upon the number of recording layers of the optical disk 107.

Hereinafter, an operation of the optical recording/reproducing apparatus according to the second conventional example will be described.

First, a recording layer will be described with reference to FIG. 20.

FIG. 20A is a cross-sectional view showing an example of the optical disk 107. FIG. 20B is a cross-sectional view showing another example of the optical disk 107.

FIG. 20A shows a single-layer disk having a single recording layer 107a. FIG. 20B shows a dual-layer disk having two recording layers 107b and 107c. Herein, it is assumed, for example, that the reproduction power of a laser beam required to reproduce information from the single-layer disk is 0.4 mW, that the optical transmittance (transmittance of the entire optical system of the optical head excluding the intensity filter 103) of the optical head 120 is 25%, and that the optical transmittance of the intensity filter 103 that is inserted in or removed from the optical path is 50%.

When the optical disk 107 has a single-layer structure as shown in FIG. 20A, it is appropriate that the intensity filter 103 is inserted in the optical path. When the intensity filter 103 is inserted in the optical path, the reproduction power of the laser beam is attenuated to 50%. Accordingly, the output power of the semiconductor laser 101 can be set to 3.2 mW (0.4 mW/25%/50%), and the quantum noise of the semiconductor laser 101 can be suppressed within an allowable range.

On the other hand, when the optical disk 107 has a dual-layer structure as shown in FIG. 20B, it is appropriate that the intensity filter 103 is removed from the optical path. When the intensity filter 103 is removed from the optical path, the transmittance with respect to the laser beam is 100%. The reproduction power required to reproduce information from the dual-layer disk is about twice as high as that for the single-layer disk. This is because the transmittance of the recording layer (recording layer 107c in FIG. 20B) located closer to the objective lens 106 out of the two recording layers of the optical disk 107 is set at about 50%. That is to say, the reproduction power of the semiconductor laser 101 required to reproduce information from the dual-layer disk is 0.8 mW (0.4 mW×2). Accordingly, the output power of the semiconductor laser 101 is 3.2 mW (0.8 mW/25%), and the quantum noise of the semiconductor laser 101 can be suppressed within an allowable range.

In the above example, the output powers of the semiconductor laser 101 required to reproduce information from the single-layer disk and from the dual-layer disk are both 3.2 mW. Further, assuming that the recording power of the laser beam required to record information on the single-layer disk is 6 mW, the output powers of the semiconductor laser 101 required to record information on the single-layer disk and on the dual-layer disk are both 48 mW (6 mW/25%/50%=12 mW/25%). As described above, the optical recording/reproducing apparatus according to the second conventional example is capable of reproducing or recording information from/on the optical disks 107 having a different number of recording layers without changing the output power of the semiconductor laser 101.

Next, an operation of the optical recording/reproducing apparatus according to the second conventional example will be described with reference to FIG. 19.

FIG. 19 is a flow chart showing an exemplary starting procedure for the optical recording/reproducing apparatus according to the second conventional example.

Initially, the optical disk 107 is inserted (Step S501). Then, the medium judgment unit 136 judges the number of recording layers of the optical disk 107 (Step S502). When the optical disk 107 has a single recording layer, the filter driving unit 130 inserts the intensity filter 103 in the optical path (Step S503). When the optical disk 107 has two recording layers, the filter driving unit 130 removes the intensity filter 103 from the optical path (Step S504). Thereafter, the reproduction signal processing unit 135 makes various adjustments in accordance with the type of the disk, and starts recording or reproducing information on/from the optical disk 107 (Step S505).

However, in the optical recording/reproducing apparatus according to the second conventional example, the state of the intensity filter 103 (transmission amount variation unit) is not detected. Thus, when the intensity filter 103 is arranged in a state different from the instruction from the control unit 137 due to a malfunction of the intensity filter 103 or the filter driving unit 130 (transmission amount variation unit), such a misarrangement cannot be detected.

Problems that arise when the intensity filter 103 is inserted in or removed from the optical path mistakenly will be described below. Herein, it is assumed that the optical transmittance of the optical head 120 (excluding the intensity filter 103) is 25%, for example.

For example, in the case where the optical disk 107 has a single-layer structure and the intensity filter 103 is not inserted in the optical path, in order to obtain a reproduction power of 0.4 mW, the output power of the semiconductor laser 101 is required to be set to 1.6 mW (0.4 mW/25%). In such a case, the semiconductor laser 101 suffers high quantum noise beyond its acceptable level. Therefore, a sufficient signal-to-noise ratio (S/N) may not be obtained.

On the other hand, for example, in the case where the optical disk 107 has a dual-layer structure and the intensity filter 103 is not removed from the optical path, assuming that the recording power required to record information on the single-layer disk is 6 mW, the recording power required to record information on the dual-layer disk is 12 mW (6 mW×2), which is about twice as high as that for the single-layer disk. Assuming that the optical transmittance of the intensity filter 103 left in the optical path is 50%, the semiconductor laser 101 is required to emit light with an output power of 96 mW (12 mW/25%/50%) in consideration of the transmittance, which is twice as high as that in the case where the intensity filter 103 is removed. Accordingly, a current larger than allowed is supplied to the semiconductor laser 101, and therefore the semiconductor laser 101 may be deteriorated or destroyed.

SUMMARY OF THE INVENTION

Therefore, in order to solve the above-mentioned conventional problems, it is an object of the present invention to provide an optical recording/reproducing apparatus that is capable of judging a malfunction of a transmission amount variation unit.

In order to achieve the above-mentioned object, an optical recording/reproducing apparatus according to the present invention for recording or reproducing information on/from a recording medium, includes:

a laser light source;

an optical output control unit for controlling an output of a laser beam emitted from the laser light source;

a photodetector that is capable of receiving the laser beam from the laser light source and outputs an electronic signal in accordance with the received laser beam;

a beam splitter for separating the laser beam from the laser light source into a first laser beam to be directed onto the photodetector and a second laser beam to be directed onto the recording medium;

a transmission amount variation unit for adjusting a transmission amount of the laser beam from the laser light source;

a transmission amount control unit for controlling the transmission amount variation unit;

a characteristic detection unit for detecting a characteristic value of the first laser beam when the photodetector receives the first laser beam; and a judgment unit for judging whether or not the transmission amount variation unit is operated in accordance with a control signal output from the transmission amount control unit by using the characteristic value from the characteristic detection unit.

In the optical recording/reproducing apparatus having the above-mentioned configuration, the characteristic detection unit detects the characteristic value of the first laser beam when the photodetector receives the first laser beam. Further, the judgment unit judges whether or not the transmission amount variation unit is operated in accordance with the control signal output from the transmission amount control unit by using the characteristic value from the characteristic detection unit. Therefore, the judgment unit can determine and recognize the operation state of the transmission amount variation unit and judge a malfunction thereof. As a result, it is possible to prevent destruction or deterioration of the laser light source due to a malfunction of the transmission amount variation unit and a recording operation with deteriorated signal quality.

Preferably, in the optical recording/reproducing apparatus according to the present invention, the transmission amount variation unit may include a first transmission amount variation unit for adjusting the transmission amount of the laser beam from the laser light source in accordance with the number of recording layers or recording sensitivity of the recording medium and a second transmission amount variation unit for adjusting the transmission amount of the laser beam from the laser light source in accordance with a reproducing operation or a recording operation with respect to the recording medium.

With this configuration, the second laser beam from the beam splitter to be directed onto the recording medium can be controlled in accordance with the number of recording layers or the recording sensitivity of the recording medium and a reproducing operation or a recording operation with respect to the recording medium. Therefore, it is possible to record or reproduce information on/from the recording medium with the second laser beam adjusted optimally in accordance with the number of recording layers or the recording sensitivity and a reproducing operation or a recording operation.

Preferably, in the optical recording/reproducing apparatus according to the present invention, the transmission amount control unit may output at least two different kinds of control signals to the transmission amount variation unit, so that an operation state of the transmission amount variation unit is switched between at least two modes.

With this configuration, the judgment unit can judge a malfunction of the transmission amount variation unit based on the characteristic values obtained when the operation state of the transmission amount variation unit is switched between at least two modes. Further, since the transmission amount variation unit has its operation state switched between at least two modes, the judgment unit can judge the operation state of the transmission amount variation unit without being affected by a change of the laser light source with time.

Preferably, in the optical recording/reproducing apparatus according to the present invention, when at least the two different kinds of control signals are output to the transmission amount variation unit, and the characteristic detection unit detects a first characteristic value E1 and a second characteristic value E2, the judgment unit may judge whether or not the first characteristic value E1, the second characteristic value E2, and laser optical transmittance m of the transmission amount variation unit satisfy following relationship, so as to judge whether or not the transmission amount variation unit is operated in accordance with the control signals output from the transmission amount control unit:

$$K1 \times m \times E2 < E1 < K2 \times m \times E2$$

(where K1 and K2 are coefficients).

With this configuration, the judgment unit can judge the operation state of the transmission amount variation unit in consideration of a detection error in the characteristic detection unit, and therefore can judge a malfunction of the transmission amount variation unit with higher accuracy.

Preferably, the optical recording/reproducing apparatus according to the present invention may include a storage unit for storing a reference characteristic value as a set characteristic value beforehand, wherein the judgment unit may judge whether or not the transmission amount variation unit is operated in accordance with the control signal output from the transmission amount control unit based on the characteristic value from the characteristic detection unit and the set characteristic value from the storage unit.

With this configuration, the judgment unit judges the operation state of the transmission amount variation unit by using the set characteristic value. Therefore, the judgment unit can judge a malfunction of the transmission amount variation unit in a shorter time than in the case where the operation state of the transmission amount variation unit is switched between at least two modes.

Preferably, in the optical recording/reproducing apparatus according to the present invention, the characteristic detection unit may detect as the characteristic value at least one of an optical output of the first laser beam obtained from the electronic signal output from the photodetector and a current supplied to the laser light source obtained from the output signal output from the optical output control unit.

With this configuration, the judgment unit can judge the operation state of the transmission amount variation unit easily based on at least one of the optical output of the first laser beam and the current supplied to the laser light source.

Preferably, in the optical recording/reproducing apparatus according to the present invention, the characteristic detection unit may detect as the characteristic value a differential quantum efficiency value of the first laser beam based on an optical output of the first laser beam obtained from the electronic signal output from the photodetector and a current supplied to the laser light source obtained from the output signal output from the optical output control unit.

With this configuration, the judgment unit judges the operation state of the transmission amount variation unit based on the differential quantum efficiency value, and therefore the judgment can be made with high accuracy Preferably, in the optical recording/reproducing apparatus according to the present invention, the characteristic detection unit may detect as the characteristic value a power of the first laser beam during a reproducing operation with respect to the recording medium.

With this configuration, the judgment unit can judge whether or not the transmission amount variation unit is operated in accordance with the control signal from the transmission amount control unit even during an information reproducing operation with respect to the recording medium.

Preferably, in the optical recording/reproducing apparatus according to the present invention, the characteristic detection unit may detect as the characteristic value a power of the first laser beam during a recording operation with respect to the recording medium.

With this configuration, the judgment unit can judge whether or not the transmission amount variation unit is operated in accordance with the control signal from the transmission amount control unit even during an information recording operation with respect to the recording medium.

Preferably, in the optical recording/reproducing apparatus according to the present invention, the judgment unit may judge whether or not the transmission amount variation unit is operated in accordance with the control signal output from the transmission amount control unit in a state where the second laser beam is prevented from being converged on the recording medium.

With this configuration, information recorded on the recording medium reliably can be prevented from being erased by the second laser beam when the judgment unit judges the operation state of the transmission amount variation unit.

Preferably, the optical recording/reproducing apparatus according to the present invention further may include a light-shielding unit that is inserted between the beam splitter and the recording medium so as to prevent the second laser beam from being converged on the recording medium.

With this configuration, the light-shielding unit prevents the second laser beam from being converged on the recording medium. Therefore, information recorded on the recording medium reliably can be prevented from being erased by the second laser beam when the judgment unit judges the operation state of the transmission amount variation unit.

Preferably, the optical recording/reproducing apparatus according to the present invention further may include:

an objective lens for converging the second laser beam on the recording medium; and a focus control unit for controlling a position of the objective lens perpendicularly to the recording medium, wherein the focus control unit may control the position of the objective lens so as to prevent the second laser beam from being converged on the recording medium during the judgment by the judgment unit.

With this configuration, since the focus control unit controls the position of the objective lens, information recorded on the recording medium reliably can be prevented from being erased by the second laser beam when the judgment unit judges the operation state of the transmission amount variation unit.

Preferably, in the optical recording/reproducing apparatus according to the present invention, the transmission amount variation unit may include an optical filter that is inserted in or removed from a space between the laser light source and the beam splitter.

With this configuration, the optical filter adjusts the transmission amount of the laser beam from the laser light source on the beam splitter, so as to change the second laser beam.

Preferably, in the optical recording/reproducing apparatus according to the present invention, the transmission amount variation unit may include a liquid crystal element.

With this configuration, a liquid crystal element adjusts the transmission amount of the laser beam from the laser light source on the beam splitter, so as to change the second laser beam. Further, a liquid crystal element is capable of adjusting the transmission amount of the laser beam by receiving an electronic signal, and therefore the adjustment of the transmission amount of the laser beam can be made in a shorter time in multi-stages.

DETAILED DESCRIPTION OF THE INVENTION

Hereinafter, preferred embodiments of the optical recording/reproducing apparatus according to the present invention will be described reference to the drawings.

Embodiment 1

Figure 1:
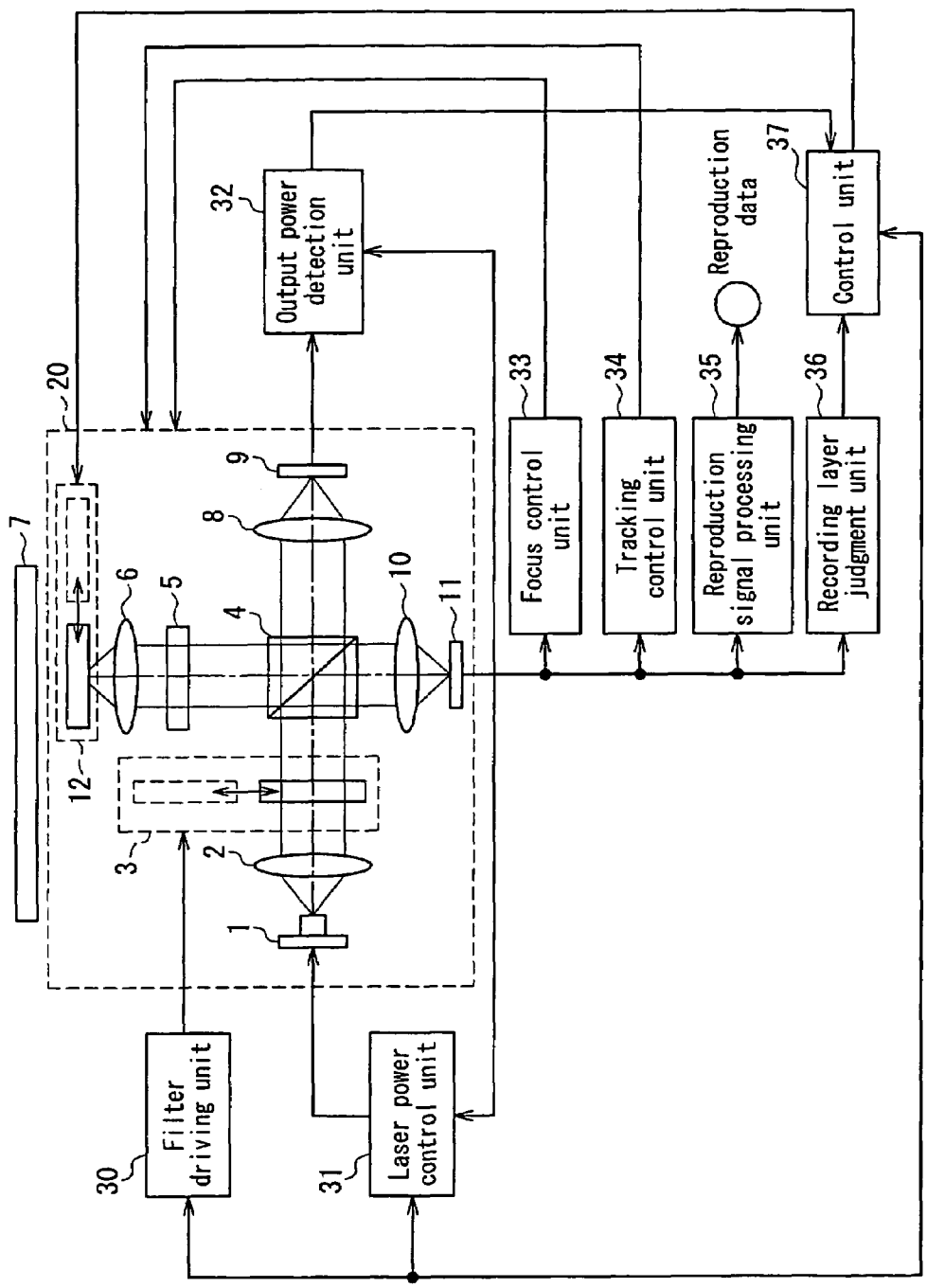
FIG. 1 is a block diagram showing a configuration of an optical recording/reproducing apparatus according to Embodiment 1 of the present invention.

FIG. 1 is a block diagram showing a configuration of an optical recording/reproducing apparatus according to Embodiment 1 of the present invention.

As shown in FIG. 1, the optical recording/reproducing apparatus of the present embodiment emits a laser beam onto an optical disk 7 (recording medium), thereby recording or reproducing information on/from the optical disk 7. This optical recording/reproducing apparatus includes an optical head 20, a filter driving unit 30 (transmission amount variation unit), a laser power control unit 31 (optical output control unit), an output power detection unit 32 (characteristic detection unit), a focus control unit 33, a tracking control unit 34, a reproduction signal processing unit 35, a recording layer judgment unit 36, and a control unit 37 judgment unit, transmission amount control unit).

First, the optical head 20 will be described. The optical head 20 includes a semiconductor laser 1 (laser light source), a collimator lens 2, an intensity filter 3 (transmission amount variation unit), a beam splitter 4, a quarter-wave plate 5, an objective lens 6 (optical lens), detection lenses 8 and 10, light-receiving elements 9 (photodetector) and 11, and a light-shielding filter 12 (light-shielding unit).

The semiconductor laser 1 is a semiconductor element that emits a laser beam such as a GaN-based blue-violet laser, for example. The collimator lens 2 converts incident light into parallel light. The intensity filter 3 is an optical filter that attenuates the intensity of incident light. The beam splitter 4 reflects and transmits incident light to separate the same. More specifically, the beam splitter 4 separates a laser beam from the semiconductor laser 1 into a first laser beam to be directed onto the light-receiving element 9 and a second laser beam to be directed onto the optical disk 7. The quarter-wave plate 5 converts polarized incident light into circularly polarized light. The objective lens 6 refracts circularly polarized incident light to converge the same. The detection lenses 8 and 10 refract incident light to converge the same. The light-receiving elements 9 and 11 are configured so as to receive a laser beam from the semiconductor laser 1, and output an electronic signal in accordance with the received laser beam. The light-shielding filter 12 shields a laser beam to be directed onto the optical disk 7.

The semiconductor laser 1, the collimator lens 2, the beam splitter 4, the detection lens 8, and the light-receiving element 9 are arranged linearly along an optical axis of the laser beam emitted from the semiconductor laser 1. The objective lens 6, the quarter-wave plate 5, the beam splitter 4, the detection lens 10, and the light-receiving element 11 are arranged linearly along an optical axis of the light reflected by the optical disk 7.

The intensity filter 3 is constituted by an optical filter including an optical absorption film, and constitutes, together with the filter driving unit 30, the transmission amount variation unit for adjusting a transmission amount of a laser beam from the semiconductor laser 1 on the beam splitter 4. The intensity filter 3 is inserted in or removed from an optical path between the collimator lens 2 and the beam splitter 4 perpendicularly to the optical path by the filter driving unit 30. The arrangement of the intensity filter 3 is not limited thereto, and the intensity filter 3 may be arranged at any positions in the optical path as long as an amount of the laser beam can be adjusted by inserting or removing the intensity filter 3 in/from the optical path mechanically.

The light-shielding filter 12 is inserted in or removed from a space between the objective lens 6 and the optical disk 7 with respect to an optical axis of the laser beam to be directed onto the optical disk 7 in accordance with a control signal from the control unit 37. The arrangement of the light-shielding filter 12 is not limited thereto, and the light-shielding filter 12 may be arranged at any positions as long as the laser beam is prevented from being converged on the optical disk 7. Specifically, the light-shielding filter 12 may be arranged between the beam splitter 4 and the quarter-wave plate 5.

Next, the laser beam emitted from the semiconductor laser 1 will be described.

The laser beam emitted from the semiconductor laser 1 is incident on the collimator lens 2. Then, the light from the collimator lens 2 is incident on the beam splitter 4. Since the intensity filter 3 can be inserted in or removed from the optical path as mentioned above, the laser beam is incident on the beam splitter 4 through the intensity filter 3 only when the intensity filter 3 is inserted.

The beam splitter 4 reflects and transmits the incident light as mentioned above. The reflected laser beam is incident on the quarter-wave plate 5. The light from the quarter-wave plate 5 is incident on the objective lens 6. The laser beam from the objective lens 6 is focused on a surface of the optical disk 7. Thereafter, the light reflected by the optical disk 7 is incident on the objective lens 6 again. The reflected light incident on the objective lens 6 is incident on the beam splitter 4 again through the quarter-wave plate 5. The reflected light incident on the beam splitter 4 is transmitted therethrough to be incident on the detection lens 10. The reflected light from the detection lens 10 is converged on the light-receiving element 11.

On the other hand, the laser beam transmitted through the beam splitter 4 is incident on the detection lens 8. The laser beam from the detection lens 8 is converged on the light-receiving element 9.

Next, a description will be given of a configuration other than the optical head 20, i.e., a control system for controlling the optical head 20, in the optical recording/reproducing apparatus of the present embodiment.

The output power detection unit 32 receives an electronic signal converted by the light-receiving element 9. The electronic signal is a signal for detecting the output power of the semiconductor laser 1, the transmission amount of a laser beam changed by the intensity filter 3, and the like. The output power detection unit 32 obtains an optical output (output power) of the laser beam (first laser beam) received by the light-receiving element 9 from the received electronic signal. Further, the output power detection unit 32 receives an output signal from the laser power control unit 31, and obtains a current supplied to the semiconductor laser 1 based on the output signal. Then, the output power detection unit 32 obtains a differential quantum efficiency value of the laser beam by performing an operation described later. The differential quantum efficiency value obtained herein is output to the control unit 37.

The laser power control unit 31 receives the output power detected by the output power detection unit 32 from the output power detection unit 32, and performs feedback control so as to make an adjustment to the current supplied to the semiconductor laser 1, so that the semiconductor laser 1 outputs the laser beam with a desired output power. Further, the laser power control unit 31 outputs the above-mentioned output signal to the output power detection unit 32 and the control unit 37 in accordance with the output of the laser beam emitted from the semiconductor laser 1.

The focus control unit 33 receives an electronic signal converted by the light-receiving element 11. The focus control unit 33 obtains focus error information from the received electronic signal, and controls the optical head 20 so as to allow the laser beam to be focused on the optical disk 7 based on the focus error information.

The tracking control unit 34 receives the electronic signal converted by the light-receiving element 11. The tracking control unit 34 obtains tracking error information from the received electronic signal, and controls the optical head 20 so as to allow the laser beam to be converged on a predetermined position on a track of the optical disk 7 based on the tracking error information.

The reproduction signal processing unit 35 receives the electronic signal converted by the light-receiving element 11. The reproduction signal processing unit 35 obtains a reproduction signal for reproducing information recorded on the optical disk 7 from the received electronic signal, subjects the obtained reproduction signal to processing such as waveform equalization, and outputs reproduction data.

The recording layer judgment unit 36 receives the electronic signal converted by the light-receiving element 11. The recording layer judgment unit 36 obtains information on the optical disk 7, such as an amount of reflected light from the optical disk 7, from the received electronic signal, and judges the number of recording layers of the optical disk 7 based on the obtained information. The number of recording layers of the optical disk 7 judged herein is output to the control unit 37.

The control unit 37 judges whether the intensity filter 3 is to be inserted in or removed from the optical path in accordance with the number of recording layers of the optical disk 7 obtained from the recording layer judgment unit 36, and transmits a control signal corresponding to the judged operation state of the intensity filter 3 to the filter driving unit 30. Further, the control unit 37 also can judge the operation state to be assumed by the intensity filter 3 and the operation state to be assumed by the filter driving unit 30 for driving the intensity filter 3 by using the differential quantum efficiency values obtained by the output power detection unit 32.

The filter driving unit 30 controls the intensity filter 3 so as to insert or remove the same in/from the optical path upon receipt of the control signal from the control unit 37.

Figure 2:
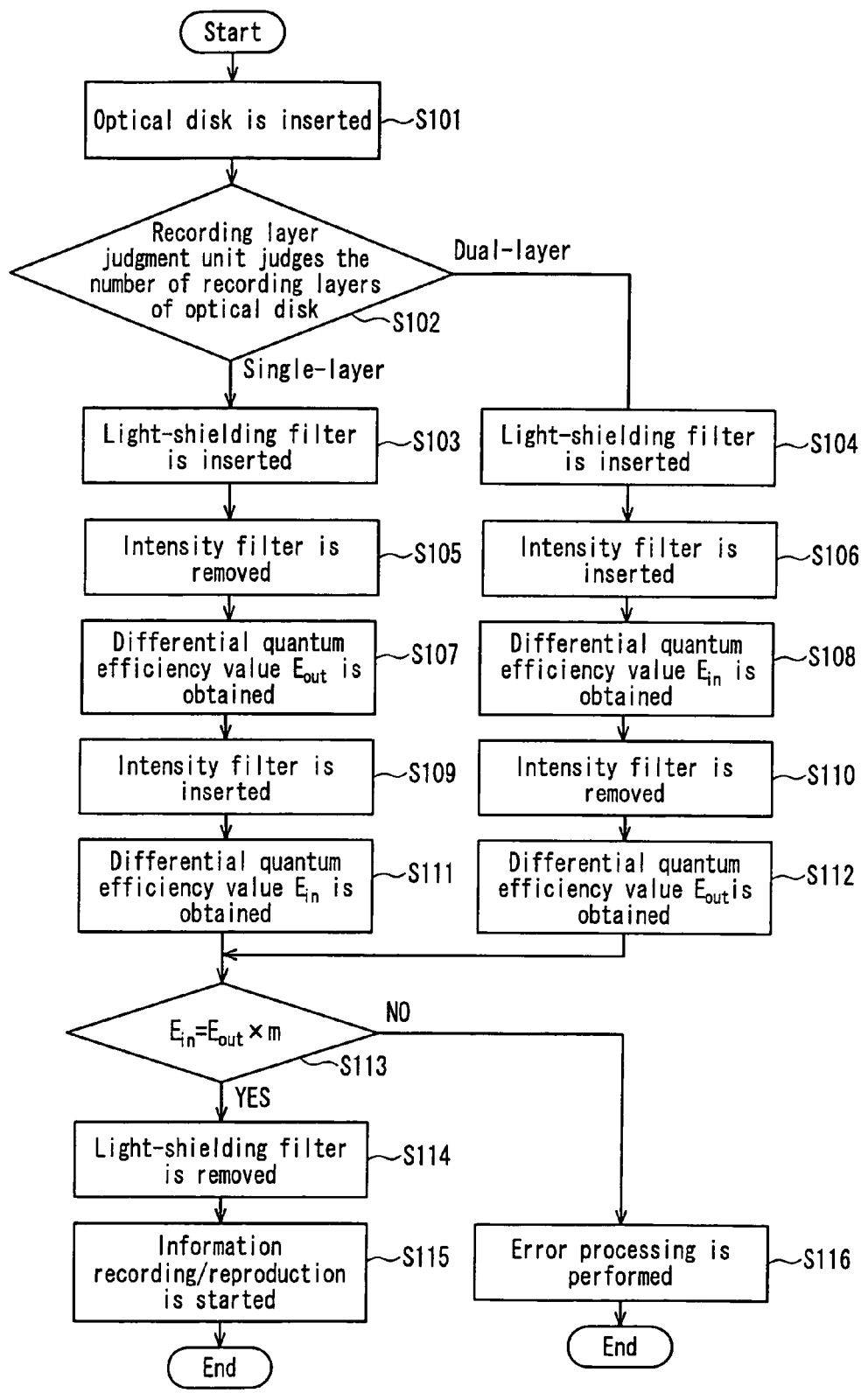
FIG. 2 is a flow chart showing an exemplary starting procedure for the optical recording/reproducing apparatus shown in FIG. 1.

Next, an operation of the optical recording/reproducing apparatus of the present embodiment will be described with reference to the drawings. FIG. 2 is a flow chart showing an exemplary starting procedure for the optical recording/reproducing apparatus shown in FIG. 1. A description will be given of pre-processing for recording/reproduction from when the optical disk 7 is inserted into the optical recording/reproducing apparatus to when information is recorded on or reproduced from the optical disk 7.

Initially, the optical disk 7 is inserted (Step S101). Then, the recording layer judgment unit 36 judges the number of recording layers of the optical disk 7 (Step S102). When the optical disk 7 has a single recording layer, the process proceeds to Step S103, where the control unit 37 inserts the light-shielding filter 12 with respect to the optical axis of the laser beam. On the other hand, in Step S102, when the optical disk 7 has two recording layers, the process proceeds to Step S104, where the control unit 37 inserts the light-shielding filter 12 with respect to the optical axis of the laser beam. The number of recording layers of the optical disk 7 is judged in the following manner, for example.

That is, the control unit 37 instructs the laser power control unit 31 to allow the semiconductor laser 1 to emit light with a predetermined output power. Then, the laser beam emitted with the predetermined output power is transmitted through the collimator lens 2, the beam splitter 4, the quarter-wave plate 5, and the objective lens 6 to be directed onto the optical disk 7. After that, the light reflected by the optical disk 7 is transmitted through the objective lens 6, the quarter-wave plate 5, the beam splitter 4, and the detection lens 10 to be incident on the light-receiving element 11. The recording layer judgment unit 36 compares an amount of the reflected light received by the light-receiving element 11 with a predetermined level of light amount, thereby judging the number of recording layers of the optical disk 7. For example, when the predetermined level of light amount is 1.0 and the amount of the reflected light received by the light-receiving element 11 is 0.5, it is judged that the optical disk 7 has two recording layers.

In the above example, the judgment as to whether the disk has a single-layer structure or a dual-layer structure is made based on a single level of light amount. However, the present invention is not limited thereto. For example, by setting predetermined levels of light amount, such as 0.33 for a three-layer disk and 0.25 for a four-layer disk, the recording layer judgment unit 36 can judge the number of recording layers also when the optical disk 7 has three or more recording layers. When judging the number of recording layers of the optical disk 7, the intensity filter 3 may be inserted in or removed from the optical path.

In Step S105, the control unit 37 transmits a control signal to the filter driving unit 30 to instruct the same to remove the intensity filter 3 from the optical path. When information is recorded/reproduced on/from the optical disk 7, the intensity filter 3 is required to be inserted in the optical path in the case of a single-layer disk. However, in the present embodiment, the intensity filter 3 is removed from the optical path as opposed to the result of the judgment by the recording layer judgment unit 36. Therefore, the light-receiving element 9 receives the laser beam that has not been transmitted through the intensity filter 3, and converts the laser beam into an electronic signal.

Next, the output power detection unit 32 receives the electronic signal converted by the light-receiving element 9, and obtains a differential quantum efficiency value Eout in the case of the intensity filter 3 being removed from the optical path (Step S107).

Figure 3:
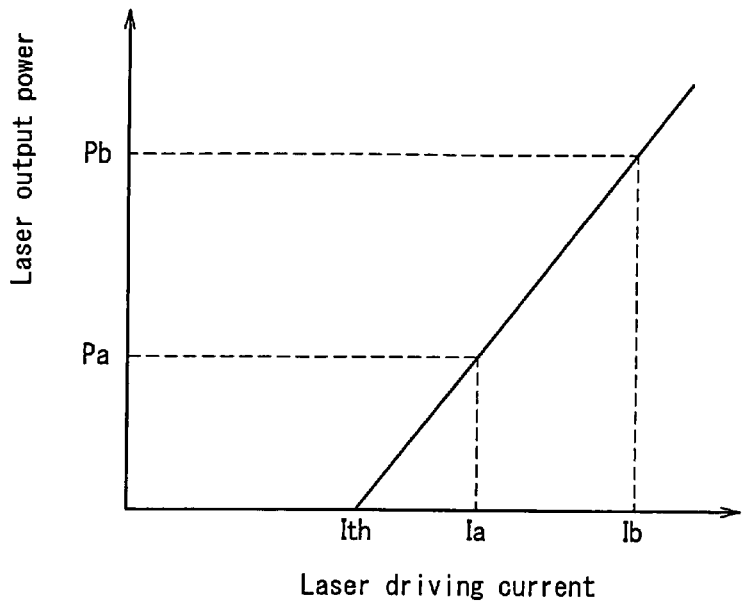
FIG. 3 is a graph showing an example of current-light output characteristics of a semiconductor laser.

The differential quantum efficiency value indicates the efficiency of the laser beam that is represented by the relationship (hereinafter, referred to as I-L characteristics) between a current supplied to the semiconductor laser 1 and an optical output of the laser beam received by the light-receiving element 9. FIG. 3 is a graph showing an example of the current-optical output characteristics (I-L characteristics) of the semiconductor laser. In FIG. 3, an X axis indicates the transition of the current supplied to the semiconductor laser 1, and a Y axis indicates the transition of the optical output of the laser beam. A differential quantum efficiency value E is represented by the slope of the current-optical output characteristics, which is thus obtained by the following Formula (1), for example.

$$E=(Pb-Pa)/(Ib-Ia) \qquad \text{Formula (1)}$$

Figure 4:
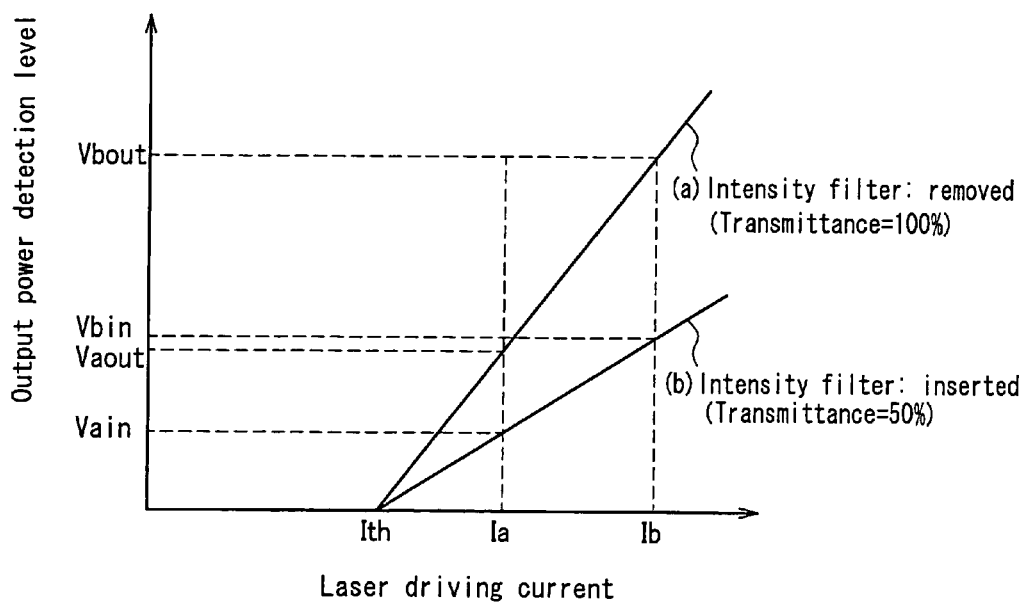
FIG. 4 is a graph showing an example of current-light output characteristics of a semiconductor laser of the optical recording/reproducing apparatus shown in FIG. 1.

Further, the output power detection unit 32 can obtain an output power detection level from the electronic signal converted by the light-receiving element 9 as well as obtain a current supplied to the semiconductor laser 1 based on the output signal from the laser power control unit 31. The relationship between the output power detection level and the current supplied to the semiconductor laser 1 is current-output power detection level characteristics (hereinafter, referred to as I-V characteristics). FIG. 4 is a graph showing an example of the current-optical output characteristics (I-V characteristics) of the semiconductor laser of the optical recording/reproducing apparatus shown in FIG. 1. In FIG. 4, an X axis indicates the transition of the current supplied to the semiconductor laser 1, and a Y axis indicates the transition of the output power detection level of the laser beam detected by the output power detection unit 32.

The output power detection unit 32 can obtain the differential quantum efficiency value using the output power detection level and the current supplied to the semiconductor laser 1. Here, since the intensity filter 3 is removed from the optical path, the I-V characteristics shown by (a) in FIG. 4 are involved. Initially, the output power detection unit 32 obtains an output power detection level (Vaout) at a predetermined current (Ia). Then, the output power detection unit 32 obtains an output power detection level (Vbout) at a current (Ib), which is obtained by increasing the current supplied to the semiconductor laser 1 gradually by the laser power control unit 31. Thereby, the output power detection unit 32 can obtain the differential quantum efficiency value Eout using the above respective values by the following Formula (2), for example.

$$Eout=(Vbout-Vaout)/(Ib-Ia) \qquad \text{Formula (2)}$$

The differential quantum efficiency value Eout obtained by the Formula (2) is output to the control unit 37. The operation expression for obtaining the differential quantum efficiency value of the present embodiment is not limited to the above example.

Next, in Step S109, the control unit 37 transmits a control signal to the filter driving unit 30 to instruct the same to insert the intensity filter 3 in the optical path. Here, the state of the intensity filter 3 relative to the optical path coincides with that as a result of the judgment by the recording layer judgment unit 36. Accordingly, the light-receiving element 9 receives the laser beam that has been transmitted thorough the intensity filter 3, and converts the laser beam into an electronic signal. Then, the output power detection unit 32 receives the electronic signal converted by the light-receiving element 9, and obtains a differential quantum efficiency value Ein in the case of the intensity filter 3 being inserted in the optical path (Step S111). Here, since the intensity filter 3 is inserted in the optical path, the I-V characteristics shown by (b) in FIG. 4 are involved. Initially, the output power detection unit 32 obtains an output power detection level (Vain) at the same amount of current (Ia) as in Step S107. Then, the output power detection unit 32 obtains an output power detection level (Vbin) at the current (Ib), which is obtained by increasing the current supplied to the semiconductor laser 1 gradually up to the same amount as in Step S107 by the laser power control unit 31. Thereby, the output power detection unit 32 can obtain the differential quantum efficiency value Ein using the above respective values by the following Formula (3), for example.

$$Ein=(Vbin-Vain)/(Ib-Ia) \qquad \text{Formula (3)}$$

The differential quantum efficiency value Ein obtained by the Formula (3) is output to the control unit 37. The operation expression for obtaining the differential quantum efficiency value of the present embodiment is not limited to the above example.

Then, the control unit 37 receives the differential quantum efficiency value Eout in the case of the intensity filter 3 being removed from the optical path and the differential quantum efficiency value Ein in the case of the intensity filter 3 being inserted in the optical path. In the case where the intensity filter 3 is inserted in and removed from the optical path as instructed by the control unit 37, when the laser optical transmittance of the intensity filter 3 is represented by m, the output power detection levels Vain, Vaout and Vbin, Vbout detected by the output power detection unit 32 satisfy the following relationships, respectively: Vain=Vaout×m and Vbin=Vbout×m. The reason for this is as follows. The laser beam detected by the output power detection unit 32 is influenced by the differential quantum efficiency of the semiconductor laser 1, the optical transmittance between the semiconductor laser 1 and the light-receiving element 9 including the intensity filter 3, and photoelectric conversion efficiency of the light-receiving element 9. However, since the processing from Steps S105 to S111 is performed in an extremely short time (e.g., approximately several seconds to several tens of seconds), the differential quantum efficiency of the semiconductor laser 1, the optical transmittance between the semiconductor laser 1 and the light-receiving element 9 excluding the intensity filter 3, and photoelectric conversion efficiency of the light-receiving element 9 are substantially constant. In other words, the influences on the laser beam other than a change in the transmission amount due to the intensity filter 3 can be ignored. Accordingly, the output power detection unit 32 calculates the differential quantum efficiency values by only considering whether the intensity filter 3 is inserted in or removed from the optical path. Thus, in Step S113, the control unit 37 judges whether or not the differential quantum efficiency values Eout and Ein and the optical transmittance m of the intensity filter 3 satisfy the relationship expressed by the following Formula (4).

$$Ein=Eout\times m \qquad \text{Formula (4)}$$

A description will be given, as an example, of the case where the intensity filter 3 that is inserted in or removed from the optical path has an optical transmittance of 50% (0.5). When the optical transmittance is 50% (0.5), the output power detection levels detected by the output power detection unit 32 satisfy the following relationships: Vain=Vaout/2 and Vbin=Vbout/2. Thus, the control unit 37 judges whether or not the differential quantum efficiency values Eout and Ein satisfy the relationship expressed by the following Formula (5).

$$Ein=Eout\times 0.5 \qquad \text{Formula (5)}$$

Further, instead of the Formula (4), the following Formula (6) may be used for the judgment in Step S113 in consideration of a detection error of the differential quantum efficiency values Eout and Ein obtained in Steps S107 and S111, respectively.

$$K1\times m\times Eout<Ein<K2\times m\times Eout \qquad \text{Formula (6)}$$

(where K1 and K2 are coefficients)

The coefficients K1 and K2 that determine the range of the differential quantum efficiency value Ein may be set arbitrarily in consideration of a degree of variations in the results of operating the differential quantum efficiency values in Steps S107 and S111. For example, when the coefficient K1 is "0.8", the coefficient K2 is "1.2", and the optical transmittance of the intensity filter 3 is 50% (0.5), substitution of these values into the Formula (6) yields the following Formula (7).

$$0.4\times Eout<Ein<0.6\times Eout \qquad \text{Formula (7)}$$

The coefficients K1 and K2 are not limited thereto, and any values are available as long as variations in the differential quantum efficiency values Eout and Ein can be eliminated. Further, in Step S113, the control unit 37 may judge whether or not the differential quantum efficiency values Eout and Ein satisfy the relationship expressed by either one of the Formulas (4) and (6).

As a result of the judgment in Step S113, when the differential quantum efficiency values Eout and Ein satisfy the relationship expressed by the Formula (4) (Yes), the light-shielding filter 12 is removed from the optical path (Step S114), the control unit 37 makes various adjustments in accordance with the type of the disk, and information recording/reproduction on/from the optical disk 7 is started (Step S115).

When the differential quantum efficiency values Eout and Ein do not satisfy the relationship expressed by the Formula (4) (No), the control unit 37 performs error processing, such as notifying a host device of the error (Step S116). Herein, the host device is a device for instructing the optical recording/reproducing apparatus of the present embodiment to perform information recording or reproduction, which may be provided inside the optical recording/reproducing apparatus or outside the optical recording/reproducing apparatus like a CPU of a personal computer and the like. As the error processing, the control unit 37 may instruct the laser power control unit 31 to stop supplying a current to the semiconductor laser 1. Alternatively, the reproduction signal processing unit 35 may stop processing the reproduction signal obtained from the light-receiving element 11, so that information reproduction from the optical disk 7 is stopped. Alternatively, the control unit 37 may stop information recording on the optical disk 7. Alternatively, the error processing may be performed such that the process is carried out from Step S102 again.

On the other hand, in Step S106, the control unit 37 transmits a control signal to the filter driving unit 30 to instruct the same to insert the intensity filter 3 in the optical path. When information is recorded/reproduced on/from the optical disk 7, the intensity filter 3 is required to be removed from the optical path in the case of a dual-layer disk. However, in the present embodiment, the intensity filter 3 is inserted in the optical path as opposed to the result of the judgment by the recording layer judgment unit 36.

Next, the output power detection unit 32 receives the electronic signal converted by the light-receiving element 9, and obtains a differential quantum efficiency value Ein in the case of the intensity filter 3 being inserted in the optical path (Step S108). Here, since the intensity filter 3 is inserted in the optical path, the I-V characteristics shown by (b) in FIG. 4 are involved. The output power detection unit 32 obtains an output power detection level (Vain) at the predetermined current (Ia), and obtains an output power detection level (Vbin) at the current (Ib), which is obtained by increasing the current under the control of the laser power control unit 31. Thereby, the output power detection unit 32 can obtain the differential quantum efficiency value Ein using the above respective values by the Formula (3), for example. Then, the differential quantum efficiency value Ein is output to the control unit 37.

In Step S110, the control unit 37 transmits a control signal to the filter driving unit 30 to instruct the same to remove the intensity filter 3 from the optical path. Here, the state of the intensity filter 3 relative to the optical path coincides with that as a result of the judgment by the recording layer judgment unit 36.

Then, the output power detection unit 32 receives the electronic signal converted by the light-receiving element 9, and obtains a differential quantum efficiency value Eout in the case of the intensity filter 3 being removed from the optical path (Step S112). Here, since the intensity filter 3 is removed from the optical path, the I-V characteristics shown by (a) in FIG. 4 are involved. The output power detection unit 32 obtains an output power detection level (Vaout) at the same amount of current (Ia) as in Step S108, and obtains an output power detection level (Vbout) at the current (Ib), which is obtained by increasing the current up to the same amount as in Step S108. Thereby, the output power detection unit 32 can obtain the differential quantum efficiency value Eout using the above respective values by the Formula (2), for example. Thereafter, the differential quantum efficiency value Eout is output to the control unit 37, and the process proceeds to Step S113.

As described above, according to the present embodiment, the output power detection unit 32 (characteristic detection unit) obtains the output power detection level (optical output) of the laser beam (first laser beam) in each of the states where the intensity filter 3 (transmission amount variation unit) is inserted in the optical path and where the intensity filter 3 is removed from the optical path as well as the current supplied to the semiconductor laser 1 (laser light source), and obtains the differential quantum efficiency value (characteristic value) in each of the states. Further, by using the differential quantum efficiency values from the output power detection unit 32, the control unit 37 (judgment unit) judges whether or not the filter driving unit 30 (transmission amount variation unit) and the intensity filter 3 driven thereby are operated in accordance with the control signal output from the control unit 37 (transmission amount control unit). Accordingly, the control unit 37 can determine and recognize the operation state of the filter driving unit 30 and the intensity filter 3 and judge a malfunction thereof. Therefore, when the optical disk 7 has a single-layer structure, it is possible to prevent a reproducing operation from being performed in a state where the intensity filter 3 is removed from the optical path mistakenly, and thus a reproducing operation with deteriorated signal quality can be prevented. On the other hand, when the optical disk 7 has a dual-layer structure, it is possible to prevent a recording operation from being performed in a state where the intensity filter 3 is inserted in the optical path mistakenly, and thus deterioration or destruction of the semiconductor laser 1 can be prevented. Further, according to the optical recording/reproducing apparatus of the present embodiment, it is possible to achieve the above-mentioned effects without adding any new components to a conventional optical recording/reproducing apparatus.

Further, in the present embodiment, the intensity filter 3 has its state switched between the two modes, i.e., being inserted in the optical path and being removed from the optical path. Therefore, the control unit 37 can judge the operation state of the filter driving unit 30 and the intensity filter 3 without being affected by a change of the semiconductor laser 1 with time.

The description has been given of the case where the optical disk 7 of the present embodiment has a single recording layer or two recording layers. However, the present invention is not limited thereto. The optical disk 7 may have three or more recording layers. For example, when the optical disk 7 has three recording layers, the control unit 37 transmits three kinds of control signals to the filter driving unit 30. The filter driving unit 30 controls the intensity filter 3 in three ways in accordance with the received control signals. However, the control unit 37 can judge whether or not the intensity filter 3 is operated in accordance with the control signal based on at least two different states of the intensity filter 3. For example, when the optical disk 7 has n recording layers (n is an integer), the control unit 37 can make a judgment by using the following Formulas (8) and (9) instead of the Formulas (4) and (6).

Ei=differential quantum efficiency value when the intensity filter 3 is in a state corresponding to a single-layer disk Ej=differential quantum efficiency value when the intensity filter 3 is in a state corresponding to an n-layer disk $$Ei = Ej \times (1/n) \quad \text{Formula (8)}$$

$$(K1/n) \times Ej < Ei < (K2/n) \times Ej \quad \text{Formula (9)}$$

(where K1 and K2 are coefficients)

The coefficients K1 and K2 that determine the range of the differential quantum efficiency value Ei may be set arbitrarily in consideration of a degree of variations in the results of operating the differential quantum efficiency values Ei and Ej.

Further, the order of the operation of the optical recording/reproducing apparatus of the present embodiment is not limited to that shown in FIG. 2, as long as the intensity filter 3 is inserted in and removed from the optical path and the control unit 37 can judge that the differential quantum efficiency values Eout and Ein in the respective states of the intensity filter 3 satisfy the relationship expressed by the Formula (4) or (6) before information is recorded on and reproduced from the optical disk 7. For example, the order of inserting and removing the intensity filter 3 in/from the optical path may be the same between the case of the optical disk 7 having a single recording layer and the case of the optical disk 7 having two recording layers. More specifically, in the case of a dual-layer disk, it is also possible that the intensity filter 3 is removed from the optical path first and the differential quantum efficiency value Eout is obtained, and then the intensity filter 3 is inserted in the optical path and the differential quantum efficiency value Ein is obtained. However, when the optical disk 7 has a single recording layer, it is preferable that the intensity filter 3 is removed from the optical path first and then is inserted in the optical path as described above. This is because the control unit 37 can finish its judging operation with the intensity filter 3 arranged in a state suitable for an optical disk having a single recording layer, and thus a recording or reproducing operation with respect to the optical disk 7 can be performed immediately. Similarly, when the optical disk 7 has two recording layers, it is preferable that the intensity filter 3 is inserted in the optical path first and then is removed from the optical path as described above. This is because the control unit 37 can finish its judging operation with the intensity filter 3 arranged in a state suitable for an optical disk having two recording layers, and thus a recording or reproducing operation with respect to the optical disk 7 can be performed immediately.

Further, instead of the intensity filter 3, a liquid crystal element, a diffraction grating, or the like may be used. A liquid crystal element is capable of adjusting a transmission amount of a laser beam by being supplied with electricity (voltage signal), and therefore a mechanism (corresponding to the filter driving unit 30) for inserting or removing the liquid crystal element in/from the optical path is not necessary. Further, by using a liquid crystal element capable of gradation control, the transmission amount can be adjusted in multi-stages.

In the optical recording/reproducing apparatus of the present embodiment, the light-shielding filter 12 is inserted so as to shield the laser beam (second laser beam) directed toward the optical disk 7 until it is judged that the intensity filter 3 and the filter driving unit 30 are operated normally. However, the present invention is not limited thereto. For example, instead of inserting the light-shielding filter 12, the focus control unit 33 may control the objective lens 6 so as to move the same perpendicularly to the optical disk 7, so that the laser beam is prevented from being focused on the optical disk 7. This can prevent reliably a recording signal (recording information) recorded on the optical disk 7 from being erased by the laser beam emitted from the semiconductor laser 1.

Further, in the present embodiment, the recording layer judgment unit 36 may judge the number of recording layers of the optical disk 7 based on the shape of a protective cartridge (not shows) for the disk, the presence/absence of an opening at a predetermined position, or the like.

Further, the recording layer judgment unit 36 may judge the number of recording layers of the optical disk 7 based on the number of S-shaped curves of a focus error signal. For example, the control unit 37 instructs the laser power control unit 31 to allow the semiconductor laser 1 to emit light with a predetermined output power, and moves the objective lens 6 in a direction perpendicular to the optical disk 7. The light-receiving element 11 receives the light reflected by the optical disk 7 in this state, and converts the same into an electronic signal. Upon receipt of the electronic signal, the recording layer judgment unit 36 judges the optical disk 7 as a single-layer disk in the case of a single S-shaped curve of a focus error signal regarding a focus shift amount, and judges the optical disk 7 as a dual-layer disk in the case of two S-shaped curves.

Further, for example, in the case where information on the number of recording layers is recorded previously in a predetermined region on the optical disk 7, such as a lead-in area, the recording layer judgment unit 36 may judge the number of recording layers by reading the information.

Embodiment 2

An optical recording/reproducing apparatus according to Embodiment 2 of the present invention will be described.

Figure 5:
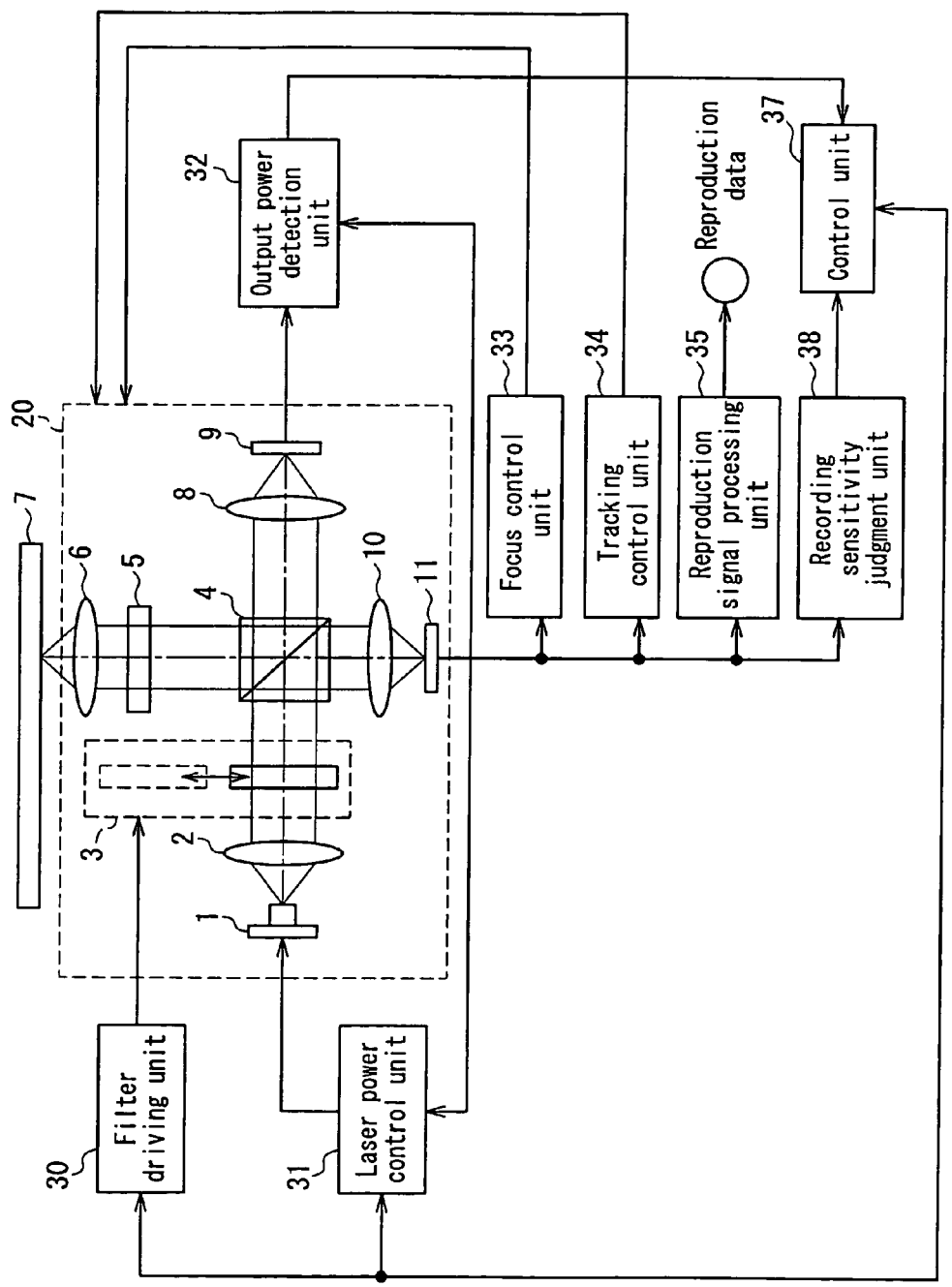
FIG. 5 is a block diagram showing a configuration of an optical recording/reproducing apparatus according to Embodiment 2 of the present invention.

FIG. 5 is a block diagram showing a configuration of the optical recording/reproducing apparatus according to Embodiment 2 of the present invention. In FIG. 5, the components having the same functions as those shown in FIG. 1 with regard to Embodiment 1 will be denoted with the same reference numerals, and descriptions thereof will be omitted.

As shown in FIG. 5, the optical recording/reproducing apparatus of the present embodiment includes an optical head 20, a filter driving unit 30 (transmission amount variation unit), a laser power control unit 31 (optical output control unit), an output power detection unit 32 (characteristic detection unit), a focus control unit 33, a tracking control unit 34, a reproduction signal processing unit 35, a recording sensitivity judgment unit 38, and a control unit 37. The optical recording/reproducing apparatus of the present embodiment is different from that of Embodiment 1 in that the recording sensitivity judgment unit 38 is provided instead of the recording layer judgment unit. The optical head 20 includes a semiconductor laser 1 (laser light source), a collimator lens 2, an intensity filter 3 (transmission amount variation unit), a beam splitter 4, a quarter-wave plate 5, an objective lens 6 (optical lens), detection lenses 8 and 10, and light-receiving elements 9 (photodetector) and 11. The optical head 20 of the present embodiment is different from that of Embodiment 1 in that the light-shielding filter 12 is not provided.

The recording sensitivity judgment unit 38 receives an electronic signal converted by the light-receiving element 11. The recording sensitivity judgment unit 38 obtains information on an optical disk 7, such as an amount of reflected light from the optical disk 7, from the received electronic signal, and judges the recording sensitivity of the optical disk 7 based on the obtained information. The recording sensitivity of the optical disk 7 judged herein is output to the control unit 37. The recording sensitivity of the optical disk 7 includes the number of recording layers and a recording (power) sensitivity specific to the optical disk 7.

Figure 6:
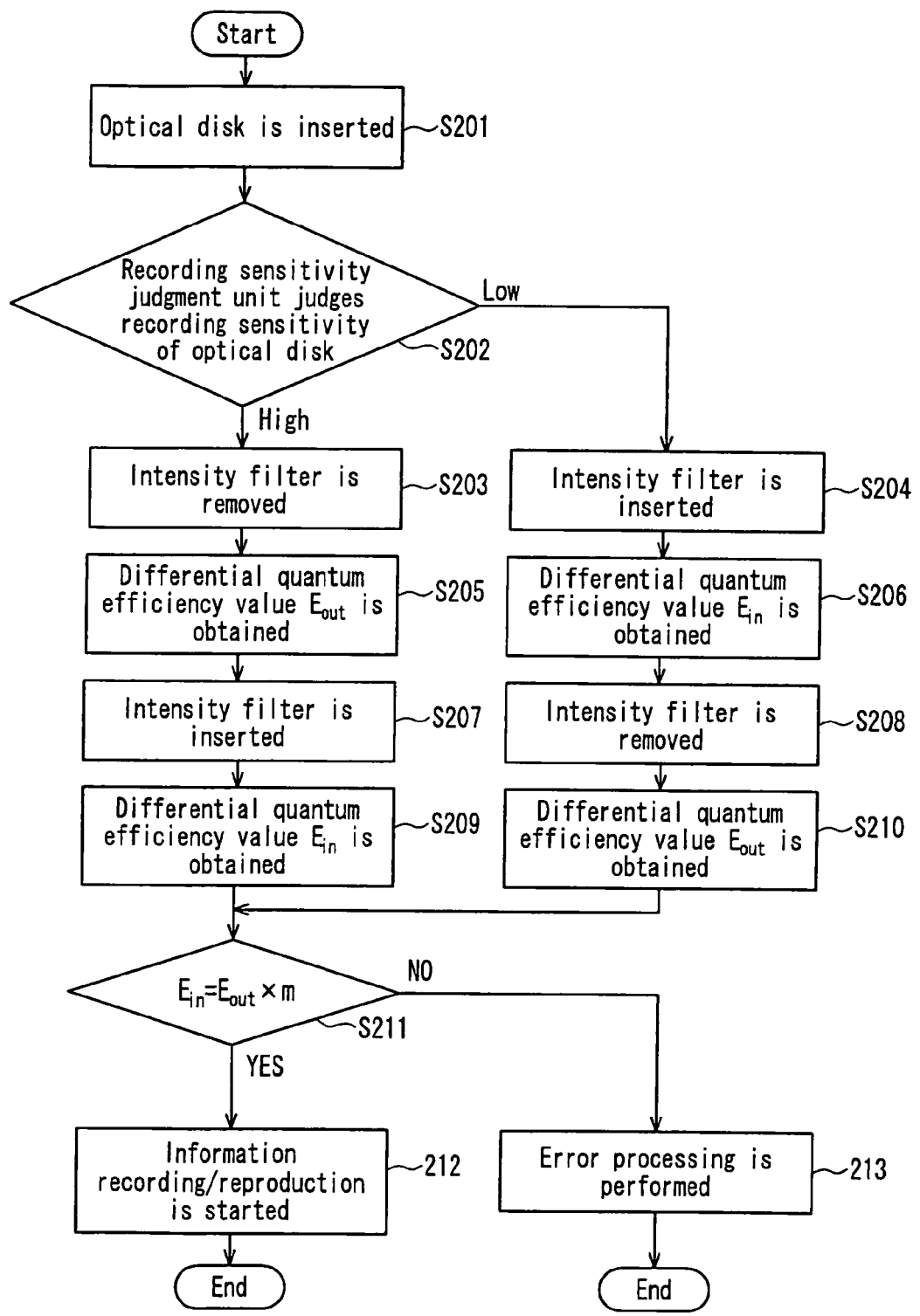
FIG. 6 is a flow chart showing an exemplary starting procedure for the optical recording/reproducing apparatus shown in FIG. 5.

Next, an operation of the optical recording/reproducing apparatus of the present embodiment will be described with reference to FIG. 6. FIG. 6 is a flow chart showing an exemplary starting procedure for the optical recording/reproducing apparatus shown in FIG. 5. A description will be given of pre-processing for recording/reproduction from when the optical disk 7 is inserted into the optical recording/reproducing apparatus to when information is recorded on or reproduced from the optical disk 7.

Initially, it is detected that the optical disk 7 is inserted (Step S201). After detecting that the optical disk 7 is inserted, the recording sensitivity judgment unit 38 judges the recording sensitivity of the optical disk 7 (Step S202). When the optical disk 7 has a high recording sensitivity, the process proceeds to Step S203. When the optical disk 7 has a low recording sensitivity, the process proceeds to Step S204. After the judging operation in Step S202, the focus control unit 33 controls the objective lens 6 so as to move the same perpendicularly to the optical disk 7, so that a laser beam from the semiconductor laser 1 is prevented from being focused on the optical disk 7. The recording sensitivity of the optical disk 7 is judged in the following manner, for example.

That is, in the case where information on the recording sensitivity is recorded previously in a predetermined region on the optical disk 7, such as a lead-in area, the recording sensitivity judgment unit 38 can judge the recording sensitivity by reading the information. When the recording sensitivity is low, a high reproduction power (or recording power) is required for reproduction (or recording). When judging the recording sensitivity of the optical disk 7, the intensity filter 3 may be inserted in or removed from an optical path.

In Step S203, the control unit 37 transmits a control signal to the filter driving unit 30 to instruct the same to remove the intensity filter 3 from the optical path. When information is recorded/reproduced on/from the optical disk 7, the intensity filter 3 is required to be inserted in the optical path in the case of a high recording sensitivity. However, in the present embodiment, the intensity filter 3 is removed from the optical path as opposed to the result of the judgment by the recording sensitivity judgment unit 38. Therefore, the laser beam emitted from the semiconductor laser 1 is incident on the light-receiving element 9 without being transmitted through the intensity filter 3, and is converted into an electronic signal by the light-receiving element 9.

Next, the output power detection unit 32 receives the electronic signal converted by the light-receiving element 9, and obtains an output power detection level (Vaout) at a predetermined current (Ia) from the received electronic signal. Then, the output power detection unit 32 obtains an output power detection level (Vbout) at a current (Ib), which is obtained by increasing a current supplied to the semiconductor laser 1 gradually by the laser power control unit 31. Thereafter, the output power detection unit 32 obtains a differential quantum efficiency value Eout by the Formula (2), for example (Step S205). The differential quantum efficiency value Eout obtained in Step S205 is output to the control unit 37.

Next, in Step S207, the control unit 37 transmits a control signal to the filter driving unit 30 to instruct the same to insert the intensity filter 3 in the optical path. Here, the state of the intensity filter 3 relative to the optical path coincides with that as a result of the judgment by the recording sensitivity judgment unit 38. Accordingly, the laser beam emitted from the semiconductor laser 1 is transmitted through the intensity filter 3 to be incident on the light-receiving element 9, and is converted into an electronic signal by the light-receiving element 9.

Then, the output power detection unit 32 receives the electronic signal converted by the light-receiving element 9, and obtains an output power detection level (Vain) at the predetermined current (Ia) from the received electronic signal. Then, the output power detection unit 32 obtains an output power detection level (Vbin) at the current (Ib), which is obtained by increasing the current supplied to the semiconductor laser 1 gradually by the laser power control unit 31. Thereafter, the output power detection unit 32 obtains a differential quantum efficiency value Ein by the Formula (3), for example (Step S209). The differential quantum efficiency value Ein is output to the control unit 37.

Next, the control unit 37 receives the differential quantum efficiency value Eout in the case of the intensity filter 3 being removed from the optical path and the differential quantum efficiency value Ein in the case of the intensity filter 3 being inserted in the optical path. The control unit 37 judges whether or not the differential quantum efficiency values Eout and Ein and the laser optical transmittance m of the intensity filter 3 satisfy the relationship expressed by the Formula (4) (Step S211). In consideration of detection variations in the differential quantum efficiency values Eout and Ein obtained in Steps S205 and S209, respectively, the Formula (6) may be used for the judgment. Further, in Step S211, the control unit 37 may judge whether or not the differential quantum efficiency values Eout and Ein satisfy the relationship expressed by either one of the Formulas (4) and (6).

As a result of the judgment in Step S211, when the differential quantum efficiency values Eout and Ein satisfy the relationship expressed by the Formula (4) (Yes), the control unit 37 makes various adjustments in accordance with the type of the disk, and information recording/reproduction on/from the optical disk 7 is started, after the objective lens 6 is moved by the focus control unit 33 so as to allow the laser beam from the semiconductor laser 1 to be focused on the optical disk 7 (Step S212). When the differential quantum efficiency values Eout and Ein do not satisfy the relationship expressed by the Formula (4) (No), the control unit 37 performs error processing, such as notifying a host device of the error, so as to prevent information recording/reproduction on/from the optical disk 7 (Step S213).

On the other hand, in Step S204, the control unit 37 transmits a control signal to the filter driving unit 30 to instruct the same to insert the intensity filter 3 in the optical path. When information is recorded/reproduced on/from the optical disk 7, the intensity filter 3 is required to be removed from the optical path in the case of a low recording intensity. However, in the present embodiment, the intensity filter 3 is inserted in the optical path as opposed to the result of the judgment by the recording sensitivity judgment unit 38.

Next, the output power detection unit 32 receives the electronic signal converted by the light-receiving element 9, and obtains an output power detection level (Vain) at the predetermined current (Ia) from the received electronic signal. Then, the output power detection unit 32 obtains an output power detection level (Vbin) at the current (Ib), which is obtained by increasing the current supplied to the semiconductor laser 1 gradually by the laser power control unit 31. Thereafter, the output power detection unit 32 obtains a differential quantum efficiency value Ein by the Formula (3), for example (Step S206). The differential quantum efficiency value Ein is output to the control unit 37.

In Step S208, the control unit 37 transmits a control signal to the filter driving unit 30 to instruct the same to remove the intensity filter 3 from the optical path. Here, the state of the intensity filter 3 relative to the optical path coincides with that as a result of the judgment by the recording sensitivity judgment unit 38.

Then, the output power detection unit 32 receives the electronic signal converted by the light-receiving element 9, and obtains an output power detection level (Vaout) at the predetermined current (Ia) from the received electronic signal. Then, the output power detection unit 32 obtains an output power detection level (Vbout) at the current (Ib), which is obtained by increasing the current supplied to the semiconductor laser 1 gradually by the laser power control unit 31. Thereafter, the output power detection unit 32 obtains a differential quantum efficiency value Eout by the Formula (2), for example (Step S210). The differential quantum efficiency value Eout is then output to the control unit 37, and the process proceeds to Step S211.

As described above, according to the present embodiment, also in the case where information recording/reproduction is performed on/from the optical disk 7 having a different recording sensitivity, the control unit 37 judges whether or not the filter driving unit 30 and the intensity filter 3 are operated in accordance with the control signal output from the control unit 37 by using the differential quantum efficiency values from the output power detection unit 32. Accordingly, the control unit 37 can determine and recognize the operation state of the filter driving unit 30 and the intensity filter 3 and judge a malfunction thereof. Therefore, when the optical disk 7 has a low recording sensitivity, for example, it is possible to prevent a recording or reproducing operation from being performed in a state where the intensity filter 3 is inserted in the optical path mistakenly.

The order of the operation of the optical recording/reproducing apparatus of the present embodiment is not limited to that shown in FIG. 6 as long as the intensity filter 3 is inserted in and removed from the optical path and the control unit 37 can judge that the differential quantum efficiency values Eout and Ein in the respective states of the intensity filter 3 satisfy the relationship expressed by the Formula (4) or (6) before information is recorded on and reproduced from the optical disk 7. For example, the order of inserting and removing the intensity filter 3 in/from the optical path may be the same regardless of the level of the recording sensitivity of the optical disk 7. More specifically, also in the case of an optical disk having a low recording sensitivity, it is possible that the intensity filter 3 is removed from the optical path first and the differential quantum efficiency value Eout is obtained, and then the intensity filter 3 is inserted in the optical path and the differential quantum efficiency value Ein is obtained. However, when the optical disk 7 has a high recording sensitivity, it is preferable that the intensity filter 3 is removed from the optical path first and then is inserted in the optical path as described above. This is because the control unit 37 can finish its judging operation with the intensity filter 3 arranged in a state suitable for an optical disk having a high recording sensitivity, and thus a recording or reproducing operation with respect to the optical disk 7 can be performed immediately. Similarly, when the optical disk 7 has a low recording sensitivity, it is preferable that the intensity filter 3 is inserted in the optical path first and then is removed from the optical path as described above. This is because the control unit 37 can finish its judging operation with the intensity filter 3 arranged in a state suitable for an optical disk having a low recording sensitivity, and thus a recording or reproducing operation with respect to the optical disk 7 can be performed immediately.

Embodiment 3

An optical recording/reproducing apparatus according to Embodiment 3 of the present invention will be described.

Figure 7:
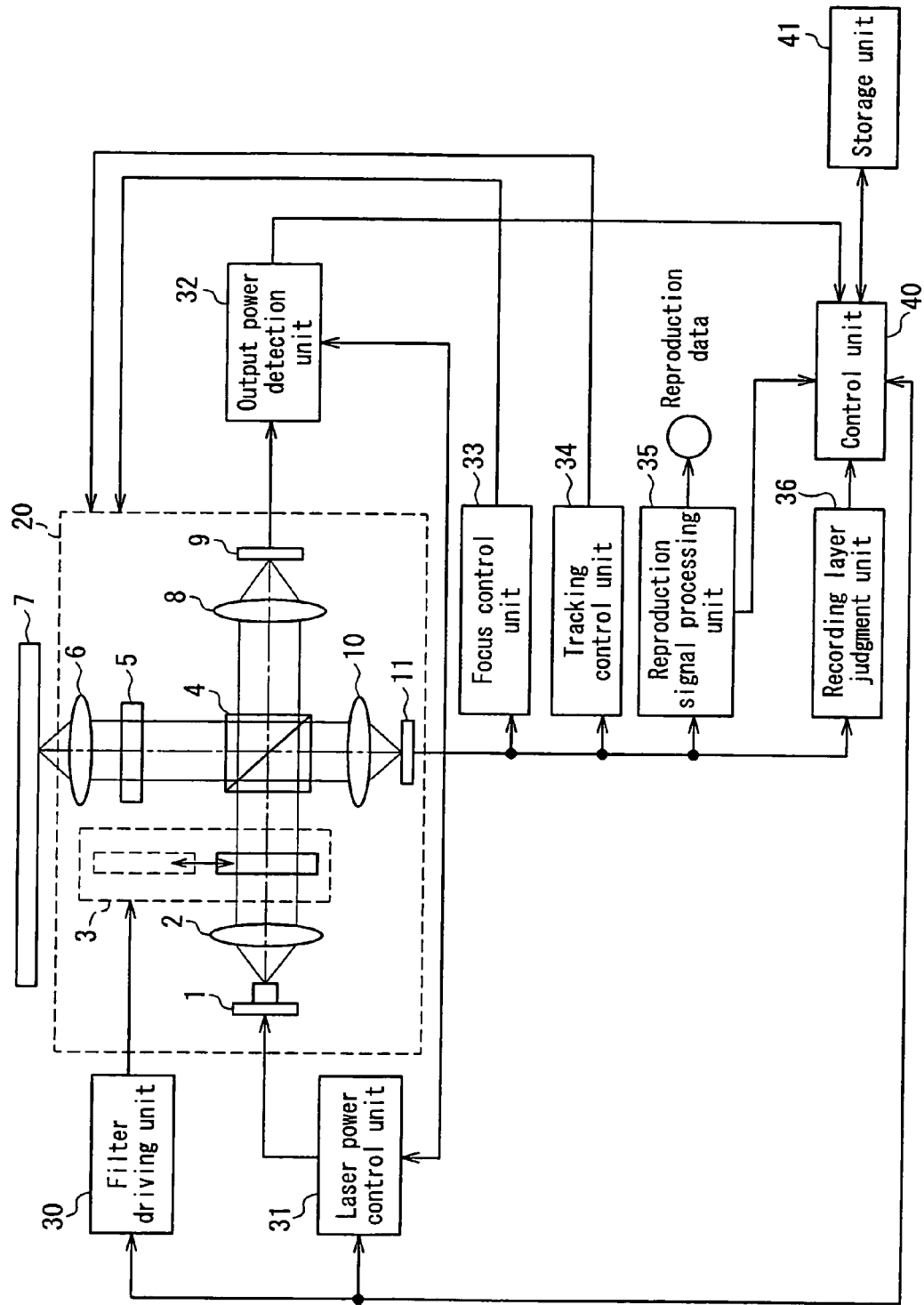
FIG. 7 is a block diagram showing a configuration of an optical recording/reproducing apparatus according to Embodiment 3 of the present invention.

FIG. 7 is a block diagram showing a configuration of the optical recording/reproducing apparatus according to Embodiment 3 of the present invention. In FIG. 7, the components having the same functions as those shown in FIG. 1 with regard to Embodiment 1 will be denoted with the same reference numerals, and descriptions thereof will be omitted.

The optical recording/reproducing apparatus of the present embodiment includes an optical head 20, a filter driving unit 30 (transmission amount variation unit), a laser power control unit 31 (optical output control unit), an output power detection unit 32 (characteristic detection unit), a focus control unit 33, a tracking control unit 34, a reproduction signal processing unit 39, a recording layer judgment unit 36, a control unit 40, and a storage unit 41. The optical head 20 includes a semiconductor laser 1 (laser light source), a collimator lens 2, an intensity filter 3 (transmission amount variation unit), a beam splitter 4, a quarter-wave plate 5, an objective lens 6 (optical lens), detection lenses 8 and 10, and light-receiving elements 9 (photodetector) and 11. The optical head 20 of the present embodiment is different from that of Embodiment 1 in that the light-shielding filter 12 is not provided.

The reproduction signal processing unit 39 receives an electronic signal converted by the light-receiving element 11 of the optical head 20. The reproduction signal processing unit 39 obtains a reproduction signal for reproducing information recorded on an optical disk 7 from the received electronic signal, subjects the obtained reproduction signal to processing such as waveform equalization, and outputs reproduction data. Further, the reproduction signal processing unit 39 extracts information on the quality of the reproduction signal, such as a degree of modulation, a jitter value, or an error rate, from the obtained reproduction signal, and outputs the information to the control unit 40.

As the storage unit 41, a flush EEPROM (Electrically Erasable Programmable Read-Only Memory) or the like can be used. The storage unit 41 stores beforehand at the factory or the like differential quantum efficiency values (set characteristic values) Ein0 and Eout0 in the case of the intensity filter 3 being inserted in an optical path and the case of the intensity filter 3 being removed from the optical path, respectively.

The control unit 40 judges whether or not the intensity filter 3 is to be inserted in or removed from the optical path in accordance with the number of recording layers of the optical disk 7 obtained from the recording layer judgment unit 36, and transmits a control signal corresponding to the judged operation state of the intensity filter 3 to the filter driving unit 30. Further, the control unit 40 receives the information on the quality of the reproduction signal from the reproduction signal processing unit 39 so as to judge the quality of the signal. Further, the control unit 40 can receive the differential quantum efficiency values stored beforehand in the storage unit 41, and compare those values with differential quantum efficiency values obtained by the output power detection unit 32, thereby judging the operation state of the intensity filter 3 and the filter driving unit 30.

Figure 8:
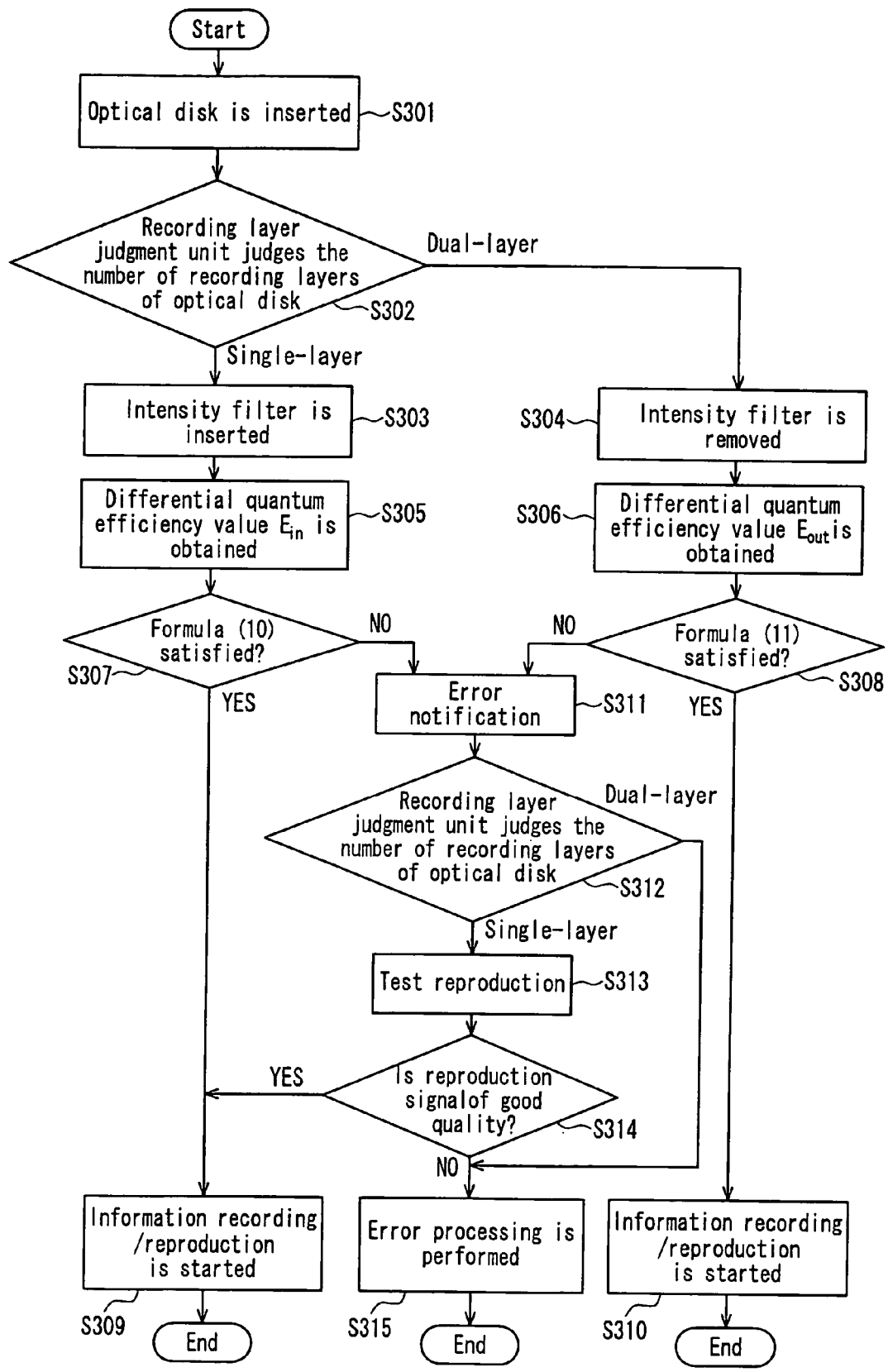
FIG. 8 is a flow chart showing an exemplary starting procedure for the optical recording/reproducing apparatus shown in FIG. 7.

Next, an operation of the optical recording/reproducing apparatus of the present embodiment will be described. FIG. 8 is a flow chart showing an exemplary starting procedure for the optical recording/reproducing apparatus shown in FIG. 7. A description will be given of pre-processing for recording/reproduction from when the optical disk 7 is inserted into the optical recording/reproducing apparatus to when information is recorded on or reproduced from the optical disk 7.

Initially, it is detected that the optical disk 7 is inserted (Step S301). After detecting that the optical disk 7 is inserted, the recording layer judgment unit 36 judges the number of recording layers of the optical disk 7 (Step S302). When the optical disk 7 has a single-layer structure, the process proceeds to Step S303. When the optical disk 7 has a dual-layer structure, the process proceeds to Step S304. After the judging operation in Step S302, the focus control unit 33 controls the objective lens 6 so as to move the same perpendicularly to the optical disk 7, so that a laser beam from the semiconductor laser 1 is prevented from being focused on the optical disk 7.

In Step S303, the control unit 40 transmits a control signal to the filter driving unit 30 to instruct the same to insert the intensity filter 3 in the optical path. Accordingly, the laser beam emitted from the semiconductor laser 1 is transmitted through the intensity filter 3 to be incident on the light-receiving element 9, and is converted into an electronic signal by the light-receiving element 9.

Next, the output power detection unit 32 receives the electronic signal converted by the light-receiving element 9, and obtains an output power detection level (Vain) at a predetermined current (Ia) from the received electronic signal. Then, the output power detection unit 32 obtains an output power detection level (Vbin) at a current (Ib), which is obtained by increasing a current supplied to the semiconductor laser 1 gradually by the laser power control unit 31. The output power detection unit 32 obtains a differential quantum efficiency value Ein by the Formula (3), for example (Step S305). The differential quantum efficiency value Ein obtained in Step S305 is output to the control unit 40.

Figure 9:
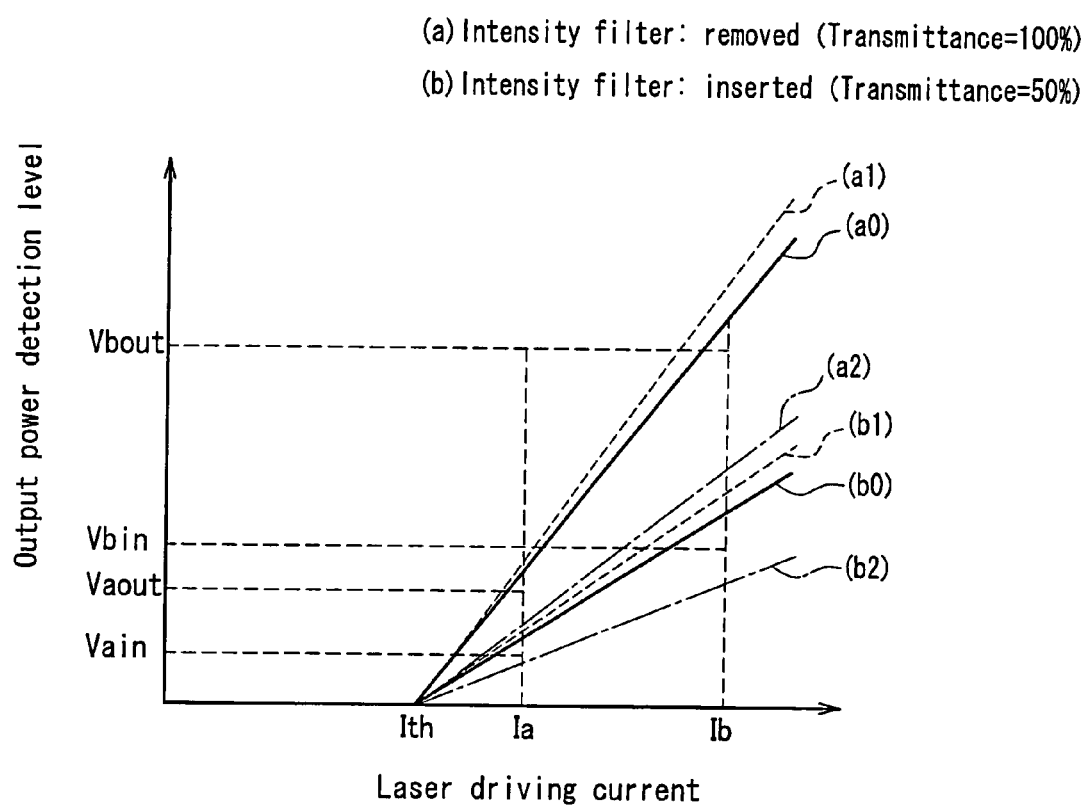
FIG. 9 is a graph showing an example of current-light output characteristics of a semiconductor laser of the optical recording/reproducing apparatus shown in FIG. 7.

Hereinafter, a description will be given of a change in the differential quantum efficiency value of the laser beam with time. FIG. 9 is a graph showing an example of the current-optical output characteristics (I-V characteristics) of the semiconductor laser of the optical recording/reproducing apparatus shown in FIG. 7. In FIG. 9, an X axis indicates the transition of the current supplied to the semiconductor laser 1, and a Y axis indicates the transition of the output power detection level of the laser beam detected by the output power detection unit 32.

The differential quantum efficiency value of the laser beam decreases with time due to deterioration of an active layer inside the semiconductor laser 1 (for example, "Good Understanding of Basics and Applications of Semiconductor Laser-Principals of Light Emission, Characteristics and Prospects of Laser Diode, Basic Explanation Series" by Shoji HIRATA, Nov. 2001, CQ Publishing Co., Ltd., Page 105). Meanwhile, there are few factors for increasing the differential quantum efficiency value of the laser beam. Accordingly, the differential quantum efficiency value after the elapse of a predetermined period of time can be expected to be within a range of −40% to +10%, for example. In FIG. 9, (a0) and (b0) represent characteristics of the differential quantum efficiency values of the laser beam at the factory, (a1) and (b1) represent characteristics of increased differential quantum efficiency values of the laser beam, and (a2) and (b2) represent characteristics of decreased differential quantum efficiency values of the laser beam.

The control unit 40 receives the differential quantum efficiency value Ein0 in the case of the intensity filter 3 being inserted in the optical path from the storage unit 41, and then judges whether or not the differential quantum efficiency value Ein obtained in Step S305 and the differential quantum efficiency value Ein0 stored in the storage unit 41 satisfy the relationship expressed by the following Formula (10) (Step S307).

$$0.6 \times Ein0 < Ein < 1.1 \times Ein0 \qquad \text{Formula (10)}$$

As a result of the judgment in Step S307, when the differential quantum efficiency values Ein0 and Ein satisfy the relationship expressed by the Formula (10) (Yes), the control unit 40 makes various adjustments in accordance with the type of the disk, and information recording/reproduction on/from the optical disk 7 is started, after the objective lens 6 is moved by the focus control unit 33 so as to allow the laser beam from the semiconductor laser 1 to be focused on the optical disk 7 (Step S309).

When the differential quantum efficiency values Ein0 and Ein do not satisfy the relationship expressed by the Formula (10) (No), the control unit 40 performs error processing, such as notifying a host device of the error, so as to prevent information recording/reproduction on/from the optical disk 7 (Step S311). The control unit 40 instructs the laser power control unit 31 to stop supplying a current to the semiconductor laser 1. Further, when the differential quantum efficiency values Ein0 and Ein satisfy a relationship of Ein<0.6×Ein0, it can be judged that the semiconductor laser 1 is deteriorated significantly as compared with that at the factory.

On the other hand, in Step S304, the control unit 40 transmits a control signal to the filter driving unit 30 to instruct the same to remove the intensity filter 3 from the optical path. Accordingly, the laser beam emitted from the semiconductor laser 1 is incident on the light-receiving element 9 without being transmitted through the intensity filter 3, and is converted into an electronic signal by the light-receiving element 9.

Next, the output power detection unit 32 receives the electronic signal converted by the light-receiving element 9, and obtains an output power detection level (Vaout) at the predetermined current (Ia) from the received electronic signal. Then, the output power detection unit 32 obtains an output power detection level (Vbout) at the current (Ib), which is obtained by increasing the current supplied to the semiconductor laser 1 gradually by the laser power control unit 31. Thereafter, the output power detection unit 32 obtains a differential quantum efficiency value Eout by the Formula (2), for example (Step S306). The differential quantum efficiency value Eout obtained in Step S306 is output to the control unit 40.

The control unit 40 receives the differential quantum efficiency value Eout0 in the case of the intensity filter 3 being removed from the optical path from the storage unit 41, and then judges whether or not the differential quantum efficiency value Eout obtained in Step S306 and the differential quantum efficiency value Eout0 stored in the storage unit 41 satisfy the relationship expressed by the following Formula (11) (Step S308).

$$0.6 \times Eout0 < Eout < 1.1 \times Eout0 \qquad \text{Formula (11)}$$

As a result of the judgment in Step S308, when the differential quantum efficiency values Eout0 and Eout satisfy the relationship expressed by the Formula (11) (Yes), the control unit 40 makes various adjustments in accordance with the type of the disk, and information recording/reproduction on/from the optical disk 7 is started, after the objective lens 6 is moved by the focus control unit 33 so as to allow the laser beam from the semiconductor laser 1 to be focused on the optical disk 7 (Step S310).

When the differential quantum efficiency values Eout0 and Eout do not satisfy the relationship expressed by the Formula (11) (No), the control unit 40 performs error processing, such as noting a host device of the error, so as to prevent information recording/reproduction on/from the optical disk 7 (Step S311).

As described above, according to the optical recording/reproducing apparatus of the present embodiment, the control unit 40 compares the differential quantum efficiency value (characteristic value) detected by the output power detection unit 32 with the differential quantum efficiency value (set characteristic value) stored in the storage unit 41 beforehand at the factory, for example, thereby judging whether or not the intensity filter 3 and the filter driving unit 30 are operated normally. Thus, unlike in the above-described embodiment, there is no need to change the arrangement of the intensity filter 3 between the two states, i.e., being inserted and being removed, so as to detect a change in the differential quantum efficiency value, and therefore the judgment can be made in a short time. Further, coefficients are determined in the Formulas (10) and (11) in consideration of a change in the I-V characteristics that is caused by temperature, deterioration with time, or the like. This allows the judgments in Steps S307 and S308 to be made precisely.

In addition to the above process, when the relationship expressed by the Formula (10) or (11) is not satisfied as a result of the judgment in Step S307 or S308, test reproduction can be performed in the case where the optical disk 7 has a single-layer structure. Specifically, in Step S312, it is judged whether or not the optical disk 7 has a single-layer structure. When the optical disk 7 has a single-layer structure, the process proceeds to Step S313. When the optical disk 7 has a dual-layer structure, the process proceeds to Step S315.

In Step S313, the control unit 40 instructs the laser power driving unit 31 to supply a current to the semiconductor laser 1. Accordingly, the laser beam emitted from the semiconductor laser 1 is focused on the optical disk 7 without being transmitted through the intensity filter 3, and the light reflected by the optical disk 7 is incident on the light-receiving element 11. The reflected light received by the light-receiving element 11 is converted into an electronic signal. The reproduction signal processing unit 39 receives the electronic signal from the light-receiving element 11, and outputs the same to the control unit 40. The control unit 40 refers to information on the quality of a reproduction signal included in the electronic signal so as to judge whether the reproduction signal is of good quality or not (Step S314). When the reproduction signal is of good quality (Yes), the control unit 40 allows information recorded on the optical disk 7 to be reproduced (Step S309). When the reproduction signal is of no good quality (No), the control unit 40 prevents information on the optical disk 7 from being reproduced (Step S315).

In this manner, even when the control unit 40 judges that the intensity filter 3 is removed mistakenly, reproduction can be performed regardless of a malfunction of the intensity filter 3 or the filter driving unit 30 in the case of the optical disk 7 having a single-layer structure, where a required output power of the laser beam is not so high as to deteriorate the semiconductor laser 1.

The coefficients ("0.6" and "1.1") in the Formulas (10) and (11) are determined assuming that the differential quantum efficiency value after the elapse of a predetermined period of time of use of the semiconductor laser 1 is within a range of −40% to +10%, for example. The coefficients in the Formulas (10) and (11) are not limited thereto, as long as they are determined in consideration of a change in the I-V characteristics that is caused by temperature, deterioration with time, or the like.

In the above description, the differential quantum efficiency values Ein0 and Eout0 are stored in the storage unit 41 at the factory. However, the time at which these values are stored beforehand in the storage unit 41 of the optical recording/reproducing apparatus of the present embodiment is not limited thereto, as long as they are set in the storage unit 41 before a factor of deterioration, such as deterioration with time, is caused. For example, the differential quantum efficiency values Ein0 and Eout0 may be set in the storage unit 41 automatically when the optical recording/reproducing apparatus is used for the first time. Further, the storage unit 41 of the present embodiment may be provided in the optical recording/reproducing apparatus of each of Embodiments 1 and 2, so that the control unit 37 judges a malfunction of the transmission amount variation unit by changing the state of the intensity filter 3 relative to the optical path between two modes as well as using the set characteristic values (Ein0 and Eout0) stored in the storage unit 41.

Embodiment 4

An optical recording/reproducing apparatus according to Embodiment 4 of the present invention will be described.

Figure 10:
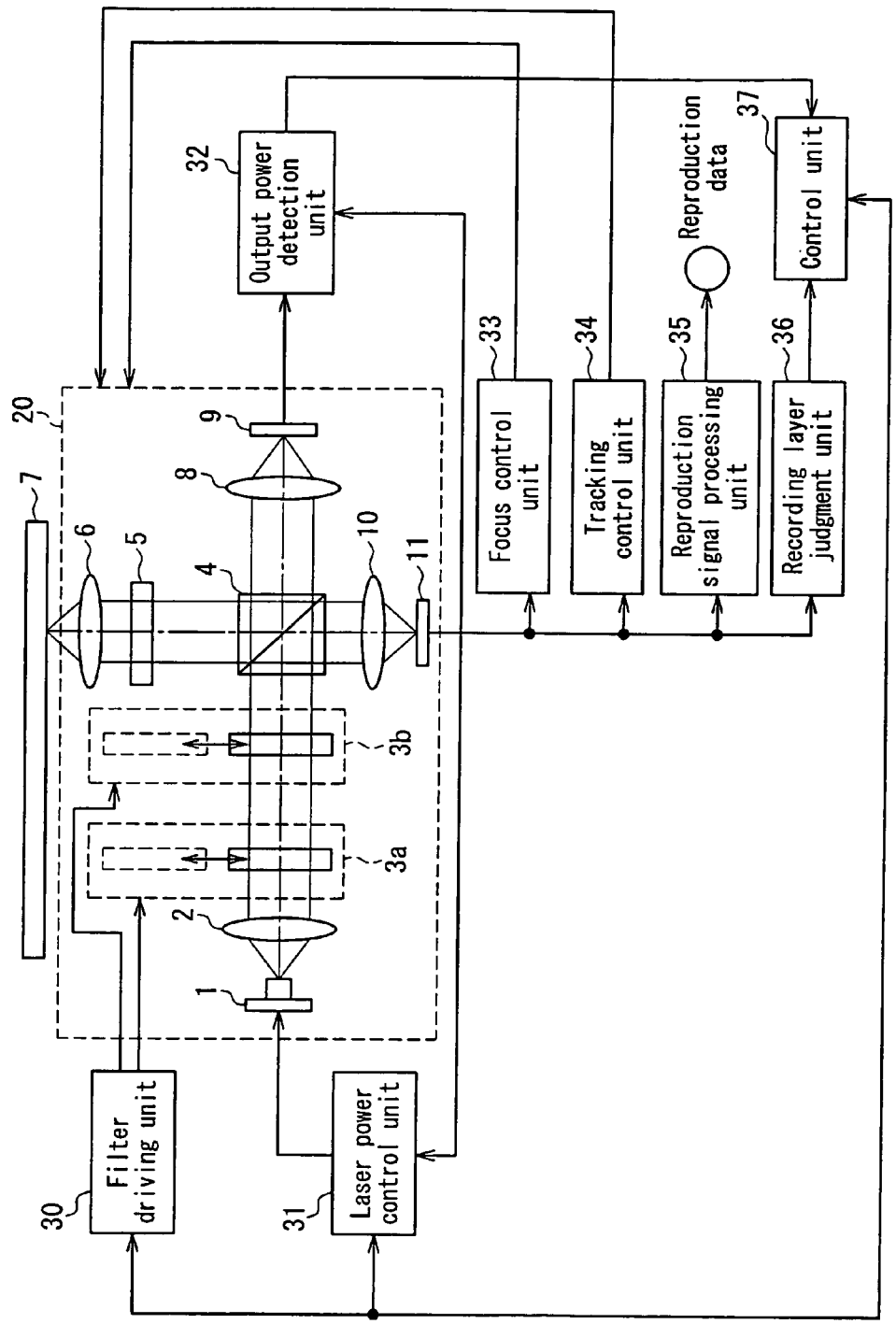
FIG. 10 is a block diagram showing a configuration of an optical recording/reproducing apparatus according to Embodiment 4 of the present invention.

FIG. 10 is a block diagram showing a configuration of the optical recording/reproducing apparatus according to Embodiment 4 of the present invention. In FIG. 10, the components having the same functions as those shown in FIG. 1 with regard to Embodiment 1 will be denoted with the same reference numerals, and descriptions thereof will be omitted.

The optical recording/reproducing apparatus of the present embodiment includes an optical head 20, a filter driving unit 30 (transmission amount variation unit), a laser power control unit 31 (optical output control unit), an output power detection unit 32 (characteristic detection unit), a focus control unit 33, a tracking control unit 34, a reproduction signal processing unit 35, a recording layer judgment unit 36, and a control unit 37. The optical head 20 includes a semiconductor laser 1 (laser light source), a collimator lens 2, a first intensity filter 3a (first transmission amount variation unit), a second intensity filter 3b (second transmission amount variation unit), a beam splitter 4, a quarter-wave plate 5, an objective lens 6 (optical lens), detection lenses 8 and 10, and light-receiving elements 9 (photodetector) and 11. The optical head 20 of the present embodiment is different from that of Embodiment 1 in that the light-shielding filter 12 is not provided.

The first intensity filter 3a constitutes the first transmission amount variation unit together with the filter driving unit 30, so as to adjust a transmission amount of a laser beam from the semiconductor laser 1 on the beam splitter 4 in accordance with the number of recording layers or the recording sensitivity of an optical disk 7, in the same manner as in the case of the intensity filter 3 in the aforementioned embodiments.

The second intensity filter 3b constitutes the second transmission amount variation unit together with the filter driving unit 30, so as to adjust a transmission amount of a laser beam from the semiconductor laser 1 on the beam splitter 4 in accordance with a reproducing operation or a recording operation with respect to the optical disk 7.

The first and second intensity filters 3a and 3b are inserted in or removed from an optical path as appropriate by the filter driving unit 30 operating in accordance with a control signal from the control unit 37 in accordance with the number of recording layers of the optical disk 7 and a recording operation or a reproducing operation with respect to the optical disk 7, respectively. The insertion or removal is performed in the manner shown in Table 1, for example.

TABLE 1

|  |  | First intensity filter | Second intensity filter |
|---|---|---|---|
| Single-layer disk | Reproducing operation | Inserted | Inserted |
|  | Recording operation | Inserted | Removed |
| Dual-layer disk | Reproducing operation | Removed | Inserted |
|  | Recording operation | Removed | Removed |

As shown in Table 1, the first intensity filter 3a, like the intensity filter 3 in Embodiment 1, is inserted or removed in accordance with the number of recording layers of the optical disk 7 judged by the recording layer judgment unit 36. The operation state of the first intensity filter 3a is judged in the same manner as that for the intensity filter 3 in a state where the second intensity filter 3b is removed from the optical path. That is to say, as shown in Steps S105 to S116 in FIG. 2, the output power detection unit 32 detects differential quantum efficiency values Ein and Eout in a state where the first intensity filter 3a is inserted and a state where the first intensity filter 3a is removed, respectively, and the control unit 37 substitutes the detected values into the Formula (4) or (6), thereby judging whether or not the first intensity filter 3a and the filter driving unit 30 are operated normally. Note here that the judgment as to the operation state of the first intensity filter 3a also can be made in a state where the second intensity filter 3b is inserted in the optical path in accordance with the process in Steps S105 to S116.

On the other hand, the second intensity filter 3b is inserted in a reproducing operation and removed in a recording operation. The control unit 37 necessarily judges whether or not the second intensity filter 3b is operated normally before a recording operation is performed (as will be described in detail hereinafter).

Hereinafter, a specific description will be given of the output power of the semiconductor laser 1 adjusted by the first and second intensity filters 3a and 3b. In the following description, it is assumed that the transmittance of each of the first and second intensity filters 3a and 3b with respect to a laser beam is 50%, that the optical transmittance (transmittance of the entire optical system of the optical head excluding the first and second intensity filters 3a and 3b) of the optical head 20 is 25%, and that the recording power on a disk surface (recording layer) required to record information on a single-layer disk is 5 mW and the reproduction power on the recording layer required to reproduce information from the single-layer disk is 0.4 mW.

In a recording operation with respect to the optical disk 7 having a single-layer structure, in order to obtain a recording power of 5 mW, a required output power of the semiconductor laser 1 is 40 mW (5 mW/25%/50%). In a recording operation with respect to the optical disk 7 having a dual-layer structure, the output power of the semiconductor laser 1 is required to be adjusted to 40 mW (5 mW×2/25%), since a recording power about twice as high as that for the single-layer disk is required.

On the other hand, in a reproducing operation with respect to the optical disk 7 having a single-layer structure, in order to obtain a reproduction power of 0.4 mW, a required output power of the semiconductor laser 1 is 6.4 mW (0.4 mW/25%/50%/50%). In a reproducing operation with respect to the optical disk 7 having a dual-layer structure, the output power of the semiconductor laser 1 is required to be adjusted to 6.4 mW (0.4 mW×2/25%/50%), since a reproduction power about twice as high as that for the single-layer disk is required. As described above, in a reproducing operation, the second intensity filter 3b is inserted in the optical path regardless of the number of recording layers of the optical disk 7, and therefore the reproduction power of the semiconductor laser 1 can be set higher than in the above-described embodiments. As a result, in the present embodiment, the quantum noise of the semiconductor laser 1 in a reproducing operation can be reduced further, resulting in a reproduction signal of good quality.

Next, an operation of the optical recording/reproducing apparatus of the present embodiment will be described with reference to the drawings. The description will be given mainly of the operation of inserting or removing the second intensity filter 3b. Further, the description will be given taking as an example the case where a reproducing operation and a recording operation are performed continuously with respect to the optical disk 7 having a dual-layer structure.

Figures 11A, 11B:
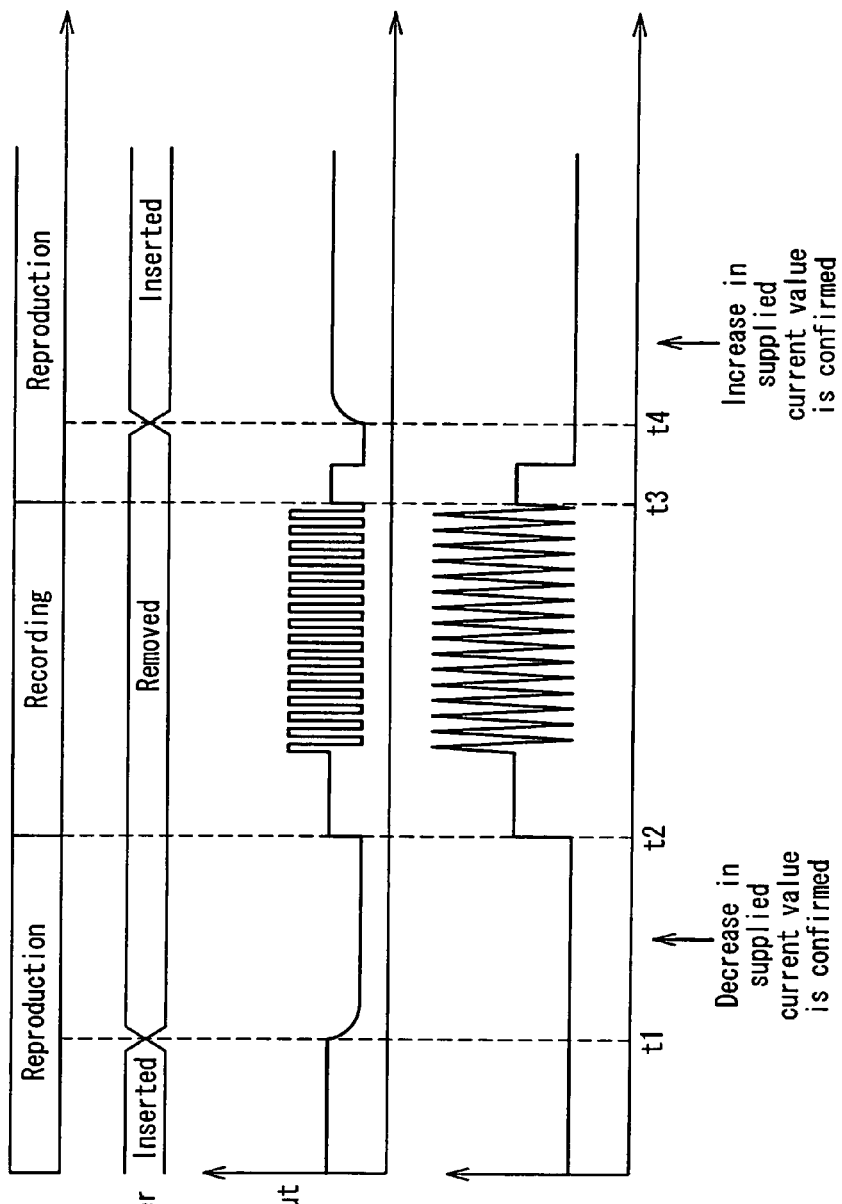
FIG. 11 is a timing chart showing an exemplary operation of the optical recording/reproducing apparatus shown in FIG. 10.
Figure 12:
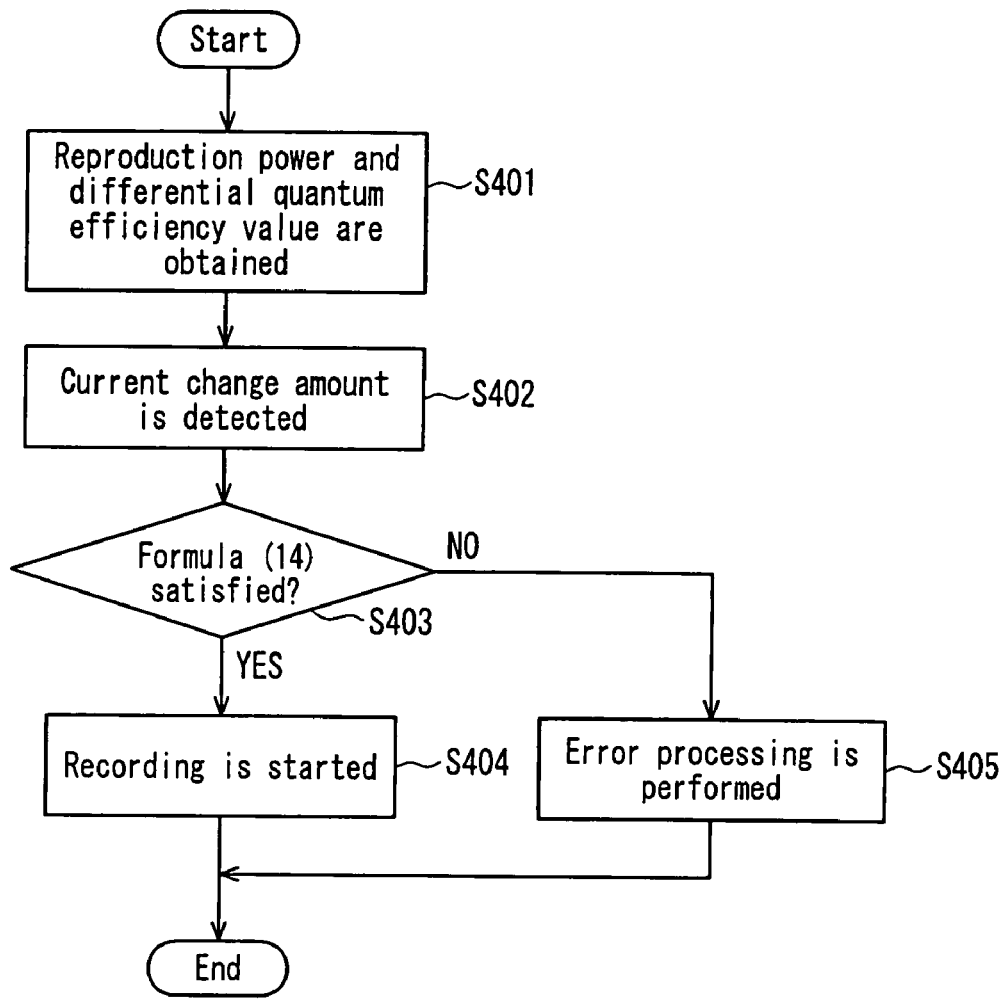
FIG. 12 is a flow chart showing an exemplary operation when a reproducing operation is switched to a recording operation in the optical recording/reproducing apparatus shown in FIG. 10.
Figure 13:
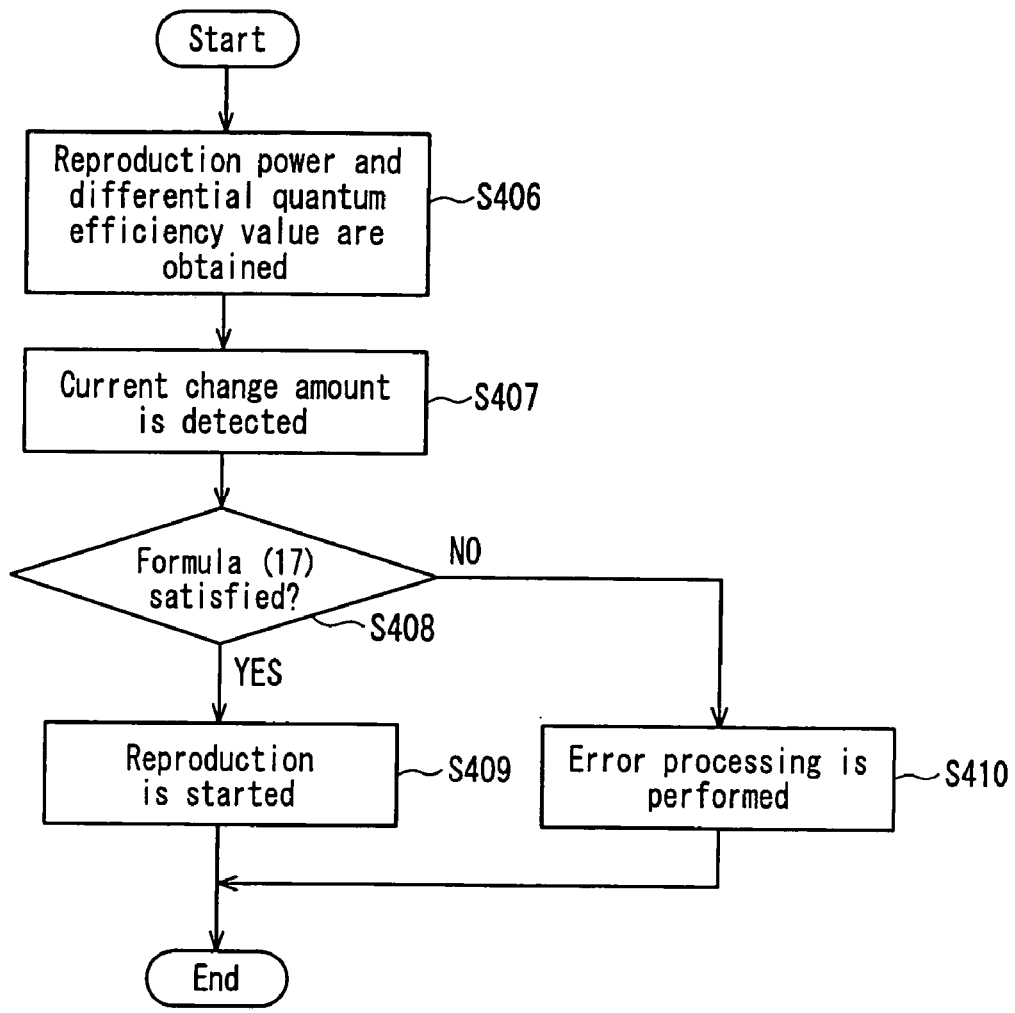
FIG. 13 is a flow chart showing an exemplary operation when a recording operation is switched to a reproducing operation in the optical recording/reproducing apparatus shown in FIG. 10.

FIG. 11 is a timing chart showing an exemplary operation of the optical recording/reproducing apparatus shown in FIG. 10. FIG. 12 is a flow chart showing an exemplary operation when a reproducing operation is switched to a recording operation in the optical recording/reproducing apparatus shown in FIG. 10. FIG. 13 is a flow chart showing an exemplary operation when a recording operation is switched to a reproducing operation in the optical recording/reproducing apparatus shown in FIG. 10.

As shown in FIG. 11, the second intensity filter 3b is inserted in the optical path during a reproducing operation and is removed at a time t1 before the start of a recording operation. At this time, when the filter driving unit 30 is operated normally to remove the second intensity filter 3b appropriately, the laser power control unit 31 performs feedback control normally by using the detection signal (reproduction power) from the output power detection unit 32 as a target value. More specifically, when the second intensity filter 3b is removed, a current supplied to the semiconductor laser 1 is reduced, so that the output power of the semiconductor laser 1 is reduced in accordance with the transmittance of the second intensity filter 3b. However, the laser power control unit 31 controls the reproduction power on the optical disk 7 in accordance with the target value. Therefore, the judgment as to the removal operation of the second intensity filter 3b can be made by using a current change amount $\Delta Ie$ between before and after the removal of the second intensity filter 3b.

When the reproduction power and the transmittance of the second intensity filter 3b are represented by Pr and T2, respectively, and the differential quantum efficiency value before the removal of the second intensity filter 3b is represented by Ea, an expected value $\Delta Ixe$ of the current change amount $\Delta Ie$ between before and after the removal of the second intensity filter 3b is expressed by the following Formula (12).

$$\Delta Ixe = Pr/(Ea/T2) - Pr/Ea \quad \text{Formula (12)}$$

When the transmittance T2 of the second intensity filter 3b is 50%, the above Formula (12) is modified to the following Formula (13).

$$\Delta Ixe = -0.5 \times (Pr/Ea) \quad \text{Formula (13)}$$

Consequently, in consideration of a detection error and the like, the control unit 37 can judge the removal operation of the second intensity filter 3b by the following Formula (14).

$$\Delta Ie < 0.8 \times \Delta Ixe \quad \text{Formula (14)}$$

Particularly, as shown in Step S401 in FIG. 12, before the time t1, the output power detection unit 32 obtains the reproduction power Pr and the differential quantum efficiency value Ea based on an electronic signal from the light-receiving element 9 and an output signal from the laser power control unit 31, and outputs the same to the control unit 37. Then, the control unit 37 substitutes the received reproduction power Pr and differential quantum efficiency value Ea into the Formula (13), thereby calculating the expected value $\Delta Ixe$. Further, the control unit 37 detects the current change amount $\Delta Ie$ between before and after the removal of the second intensity filter 3b based on the output signal from the laser power control unit 31 (Step S402).

After that, the control unit 37 judges whether or not the calculated expected value $\Delta Ixe$ and the detected current change amount $\Delta Ie$ satisfy the Formula (14) (Step S403). When the Formula (14) is satisfied, the control unit 37 judges that the second intensity filter 3b is removed from the optical path, and switches the reproducing operation to a recording operation to start information recording at a time t2 shown in FIG. 11 (Step S404).

On the other hand, when the Formula (14) is not satisfied in Step S403, the control unit 37 judges that the second intensity filter 3b is not removed from the optical path, and performs error processing (Step S405).

In the case where the recording operation is followed by a reproducing operation continuously, as shown in FIG. 11, the second intensity filter 3b is inserted in the optical path at a time t4 after the elapse of a predetermined period of time from a time t3 when the recording operation is switched to a reproducing operation. At this time, when the filter driving unit 30 is operated normally to insert the second intensity filter 3b appropriately, the laser power control unit 31 performs feedback control normally by using the detection signal (reproduction power) from the output power detection unit 32 as a target value. More specifically, when the second intensity filter 3b is inserted, the current supplied to the semiconductor laser 1 is increased, so that the output power of the semiconductor laser 1 is increased accordingly in accordance with the transmittance of the second intensity filter 3b. However, the laser power control unit 31 controls the reproduction power on the optical disk 7 in accordance with the target value. Therefore, the judgment as to the insertion operation of the second intensity filter 3b can be made by using a current change amount $\Delta Ii$ between before and after the insertion of the second intensity filter 3b.

When the reproduction power and the transmittance of the second intensity filter 3b are represented by Pr and T2, respectively, and the differential quantum efficiency value before the insertion of the second intensity filter 3b is represented by Eb, an expected value $\Delta Ixi$ of the current change amount $\Delta Ii$ between before and after the insertion of the second intensity filter 3b is expressed by the following Formula (15).

$$\Delta Ixi = Pr/(Eb \times T2) - Pr/Eb \quad \text{Formula (15)}$$

When the transmittance T2 of the second intensity filter 3b is 50%, the above Formula (15) is modified to the following Formula (16).

$$\Delta Ixi = (Pr/Eb) \quad \text{Formula (16)}$$

Consequently, in consideration of a detection error and the like, the control unit 37 can judge the insertion operation of the second intensity filter 3b by the following Formula (17).

$$\Delta Ii > 0.8 \times \Delta Ixi \quad \text{Formula (17)}$$

Particularly, as shown in Step S406 in FIG. 13, before the time t4, the output power detection unit 32 obtains the reproduction power Pr and the differential quantum efficiency value Eb based on the electronic signal from the light-receiving element 9 and the output signal from the laser power control unit 31, and outputs the same to the control unit 37. Then, the control unit 37 substitutes the received reproduction power Pr and differential quantum efficiency value Eb into the Formula (16), thereby calculating the expected value ΔIxi. Further, the control unit 37 detects the current change amount ΔIi between before and after the insertion of the second intensity filter 3b based on the output signal from the laser power control unit 31 (Step S407).

After that, the control unit 37 judges whether or not the calculated expected value ΔIxi and the detected current change amount ΔIi satisfy the Formula (17) (Step S408). When the Formula (17) is satisfied, the control unit 37 judges that the second intensity filter 3b is inserted in the optical path, and starts information reproduction substantially from the time t4 (Step S409).

On the other hand, when the Formula (17) is not satisfied in Step S408, the control unit 37 judges that the second intensity filter 3b is not inserted in the optical path, and performs error processing (Step S410).

In the above configuration of the present embodiment, the first and second intensity filters 3a and 3b that are inserted in or removed from the optical path are provided, and therefore it is possible to control the laser beam (second laser beam) to be incident on the optical disk 7 through the beam splitter 4 in accordance with the number of recording layers or the recording sensitivity of the optical disk 7 and a reproducing operation or a recording operation with respect to the optical disk 7, respectively. Consequently, in the present embodiment, information can be recorded on or reproduced from the optical disk 7 with the laser beam adjusted optimally in accordance with the number of recording layers or the recording sensitivity and a reproducing operation or a recording operation. Further, it is judged whether or not the second intensity filter 3b is inserted mistakenly before a recording operation is performed. Therefore, the output power of the semiconductor laser 1 can be prevented from being increased inappropriately due to wrong insertion of the second intensity filter 3b, and thus deterioration or destruction of the semiconductor laser 1 can be avoided reliably. Further, it is judged whether or not the second intensity filter 3b is removed mistakenly before a reproducing operation is performed. Therefore, the reproduction signal can be prevented from being deteriorated due to wrong removal of the second intensity filter 3b.

In addition to the above-described configuration, there is a case where the control system for controlling the optical head 20 is capable of performing automatic power control (hereinafter, referred to as APC). In such a case, it is also possible to remove the second intensity filter 3b after the laser power control unit 31 reduces the reproduction power to about one half. Consequently, in the case where a reproducing operation is followed by a recording operation instantly, the output power of the semiconductor laser 1 can be prevented from being increased rapidly due to band limiting of the APC when the second intensity filter 3b is removed.

Figures 14A, 14B:
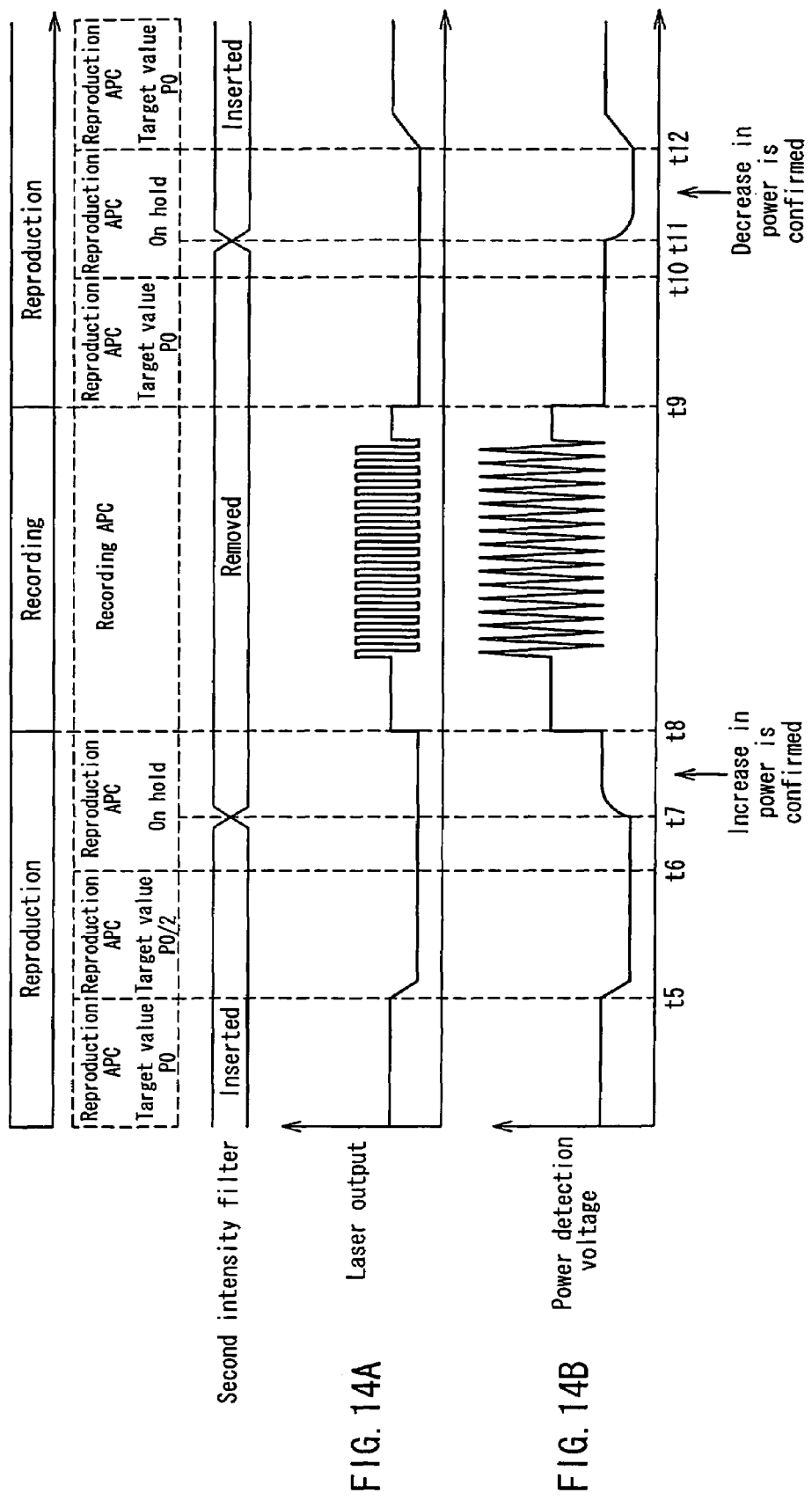
FIG. 14 is a timing chart showing an exemplary operation of a modified example of the optical recording/reproducing apparatus shown in FIG. 10.

More specifically, as shown in FIG. 14, in a state where the second intensity filter 3b is inserted in the optical path, the laser power control unit 31 switches a set target value P0 in the reproduction APC to a target value P0/2 at a time t5. Then, at a time t6 after the elapse of a predetermined period of time from the time t5, the laser power control unit 31 puts the reproduction APC on hold. In other words, the laser power control unit 31 allows a target value in feedback control to be fixed at P0/2. Thereafter, the second intensity filter 3b is removed from the optical path at a time t7 before the start of a recording operation. In this case, when the target value in the reproduction APC is not reduced to about one half between the time t5 and the time t6, the current supplied to the semiconductor laser 1 is increased sharply after the time t7, and accordingly the output power of the semiconductor laser 1 inevitably is increased rapidly, since the speed for removing the second intensity filter 3b is much higher than that for performing the band limiting (e.g., 1 kHz). Preferably, the reduction rate of the target value in the reproduction APC is changed as appropriate in accordance with the transmittance of the second intensity filter 3b. For example, when the transmittance of the second intensity filter 3b is 25%, preferably, the target value in the reproduction APC is reduced to about one quarter before the second intensity filter 3b is removed.

Further, in the case where the laser power control unit 31 performs the reproduction APC, the judgment as to the removal operation of the second intensity filter 3b can be performed by using a reproduction power change (increase) amount ΔPre between before and after the removal of the second intensity filter 3b.

When the transmittance of the second intensity filter 3b is represented by T2, an expected value ΔPxe of the reproduction power increase amount ΔPre between before and after the removal of the second intensity filter 3b is expressed by the following Formula (18).

$$\Delta Pxe = Pr - T2 \times Pr \quad \text{Formula (18)}$$

Consequently, in consideration of a detection error and the like, the control unit 37 can judge the removal operation of the second intensity filter 3b by the following Formula (19).

$$\Delta Pre < 0.8 \times \Delta Pxe \quad \text{Formula (19)}$$

Figure 15:
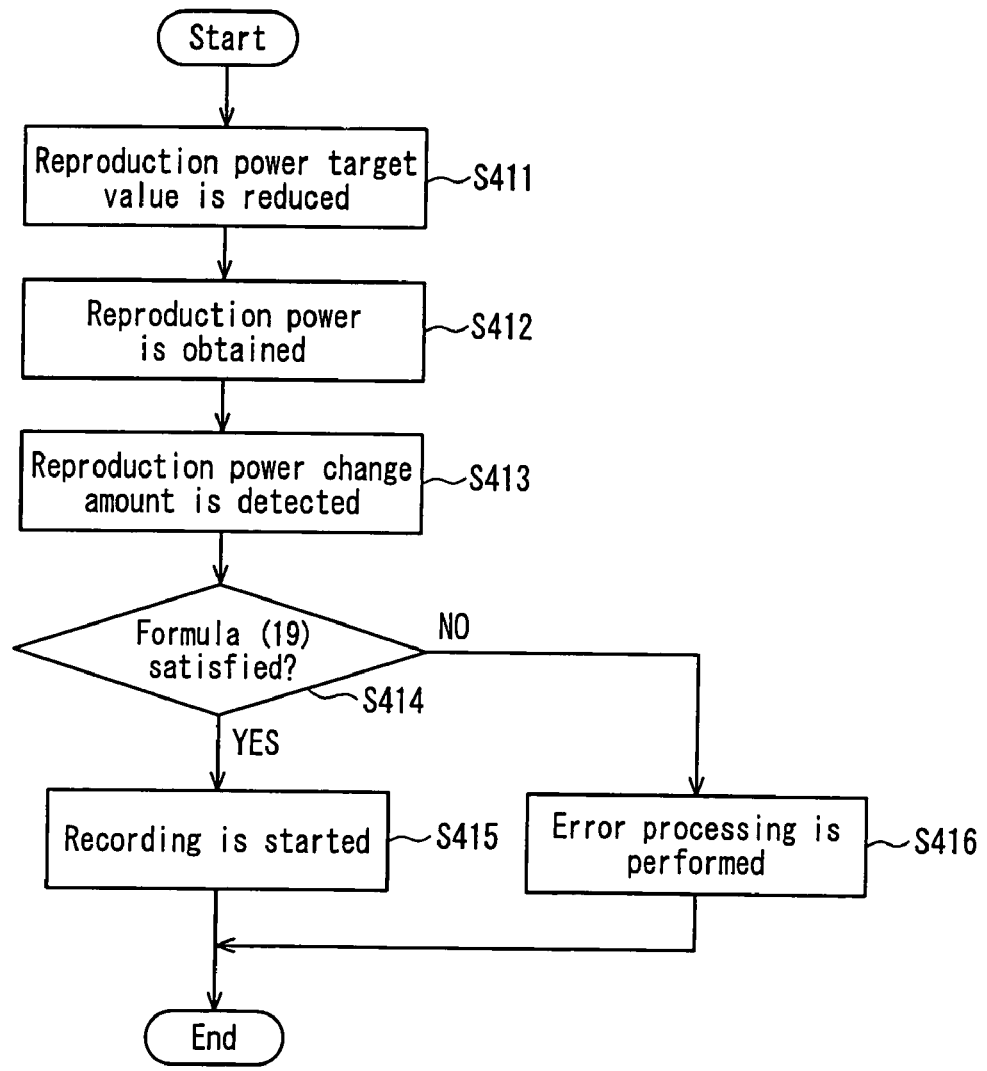
FIG. 15 is a flow chart showing an exemplary operation when a reproducing operation is switched to a recording operation in the modified example of the optical recording/reproducing apparatus shown in FIG. 10.

Particularly, as shown in Step S411 in FIG. 15, after the laser power control unit 31 reduces the reproduction power target value in the reproduction APC at the time t5, the output power detection unit 32 obtains the reproduction power Pr based on the electronic signal from the light-receiving element 9, and outputs the same to the control unit 37 (Step S412). Then, the control unit 37 substitutes the received reproduction power Pr into the Formula (18), thereby calculating the expected value ΔPxe. Further, the control unit 37 detects the reproduction power increase amount ΔPre between before and after the removal of the second intensity filter 3b based on the output signal from the output power detection unit 32 (Step S413).

After that, the control unit 37 judges whether or not the calculated expected value ΔPxe and the detected increase amount ΔPre satisfy the Formula (19) (Step S414). When the Formula (19) is satisfied, the control unit 37 judges that the second intensity filter 3b is removed from the optical path, and switches the reproducing operation to a recording operation at a time t8 in FIG. 14 to start information recording (Step S415).

On the other hand, when the Formula (19) is not satisfied in Step S414, the control unit 37 judges that the second intensity filter 3b is not removed from the optical path, and performs error processing (Step S416).

In the case where the recording operation is followed by a reproducing operation continuously, as shown in FIG. 14, the reproduction APC is put on hold at a time t10 after the elapse of a predetermined period of time from a time t9 when the recording operation is switched to a reproducing operation, and then the second intensity filter 3b is inserted in the optical path at a time t11.

The judgment as to the insertion operation of the second intensity filter 3b can be performed by using a reproduction power change (decrease) amount ΔPri between before and after the insertion of the second intensity filter 3b, as in the case of the judgment as to the removal operation.

That is, when the transmittance of the second intensity filter 3b is represented by T2, an expected value ΔPxi of the reproduction power decrease amount ΔPri between before and after the insertion of the second intensity filter 3b is expressed by the following Formula (20).

$$\Delta Pxi = T2 \times Pr - Pr \quad \text{Formula (20)}$$

Consequently, in consideration of a detection error and the like, the control unit 37 can judge the insertion operation of the second intensity filter 3b by the following Formula (21).

$$\Delta Pri > 0.8 \times \Delta Pxi \quad \text{Formula (21)}$$

Figure 16:
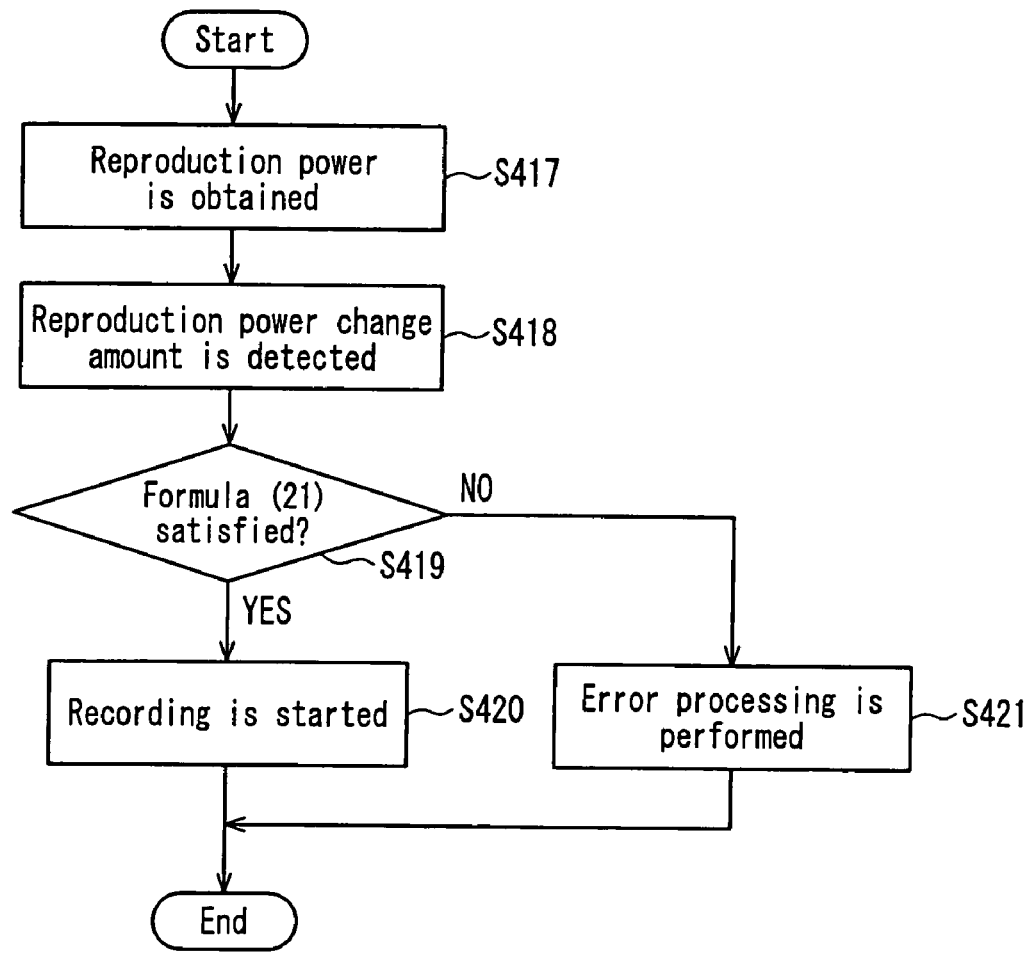
FIG. 16 is a flow chart showing an exemplary operation when a recording operation is switched to a reproducing operation in the modified example of the optical recording/reproducing apparatus shown in FIG. 10.

Particularly, as shown in Step S417 in FIG. 16, the output power detection unit 32 obtains the reproduction power Pr based on the electronic signal from the light-receiving element 9, and outputs the same to the control unit 37 (Step S417). Then, the control unit 37 substitutes the received reproduction power Pr into the Formula (20), thereby calculating the expected value ΔPxi. Further, the control unit 37 detects the reproduction power decrease amount ΔPri between before and after the insertion of the second intensity filter 3b based on the output signal from the output power detection unit 32 (Step S418).

After that, the control unit 37 judges whether or not the calculated expected value ΔPxi and the detected decrease amount ΔPri satisfy the Formula (21) (Step S419). When the Formula (21) is satisfied, the control unit 37 judges that the second intensity filter 3b is inserted in the optical path, and starts information reproduction substantially from a time t12 in FIG. 14 (Step S420).

On the other hand, when the Formula (21) is not satisfied in Step S419, the control unit 37 judges that the second intensity filter 3b is not inserted in the optical path, and performs error processing (Step S421).

In the above description, the single filter driving unit drives (inserts or removes) both the first and second intensity filters. However, an individual filter driving unit may be provided for each of the intensity filters. Further, instead of, for example, the second intensity filter, a diffraction grating, a liquid crystal element, or the like, which is different from an optical filter, may be used.

The second transmission amount variation unit of the present embodiment may be incorporated into the optical recording/reproducing apparatus of each of Embodiments 1 to 3.

In each of the above-described embodiments, the judgment as to whether or not the intensity filter and the filter driving unit are operated normally is made by using the differential quantum efficiency value based on the I-V characteristics. However, the present invention is not limited thereto, as long as a characteristic detection unit detects a characteristic value of a first laser beam received by a photodetector, and a judgment unit judges whether or not a transmission amount variation unit is operated in accordance with a control signal output from a transmission amount control unit by using the characteristic value from the characteristic detection unit. For example, the characteristic detection unit may detect as the characteristic value at least one of an optical output of the first laser beam that is obtained from an electronic signal output from the photodetector and a current supplied to a laser light source that is obtained from an output signal from an optical output control unit. In such a case, the judgment unit can judge the operation state of the transmission amount variation unit easily based on at least one of the optical output of the first laser beam and the current supplied to the laser light source. However, it is preferable that the judgment unit judges the operation state of the transmission amount variation unit based on the differential quantum efficiency value of the first laser beam. This is because in such a case, a change of the laser light source with time, which is included in each of the optical output and the current, can be canceled, and therefore the judgment unit can judge the operation state of the transmission amount variation unit with high accuracy.

Further, in addition to the above-described configuration, the recording power of the laser beam emitted from the semiconductor laser may be used as the characteristic value, for example.

In such a case, the laser beam is emitted to a predetermined test-writing region on the optical disk, and a test-writing power is learned in the test-writing region. Therefore, it is possible to judge whether or not the intensity filter and the filter driving unit are operated normally without erasing a recording signal recorded on the optical disk by the laser beam emitted from the semiconductor laser.

Hereinafter, a description will be given of an operation of the optical recording/reproducing apparatus in the case where the recording power of the laser beam is used instead of the differential quantum efficiency value based on the I-V characteristics. This operation is performed, for example, immediately after the insertion of the optical disk into the optical recording/reproducing apparatus, at regular time intervals, or the like.

Initially, a laser beam is emitted from the semiconductor laser to a test-writing region on the optical disk. Then, the laser power control unit changes the recording power of the laser beam emitted to the test-writing region on the optical disk variously, and the output power detection unit detects a recording power that allows a predetermined degree of modulation to be achieved. The control unit compares the recording power at the predetermined degree of modulation in the case of the intensity filter being inserted in the optical path with the recording power at the predetermined degree of modulation in the case of the intensity filter being removed from the optical path, thereby judging whether or not the intensity filter and the filter driving unit are operated normally.

Figure 17:
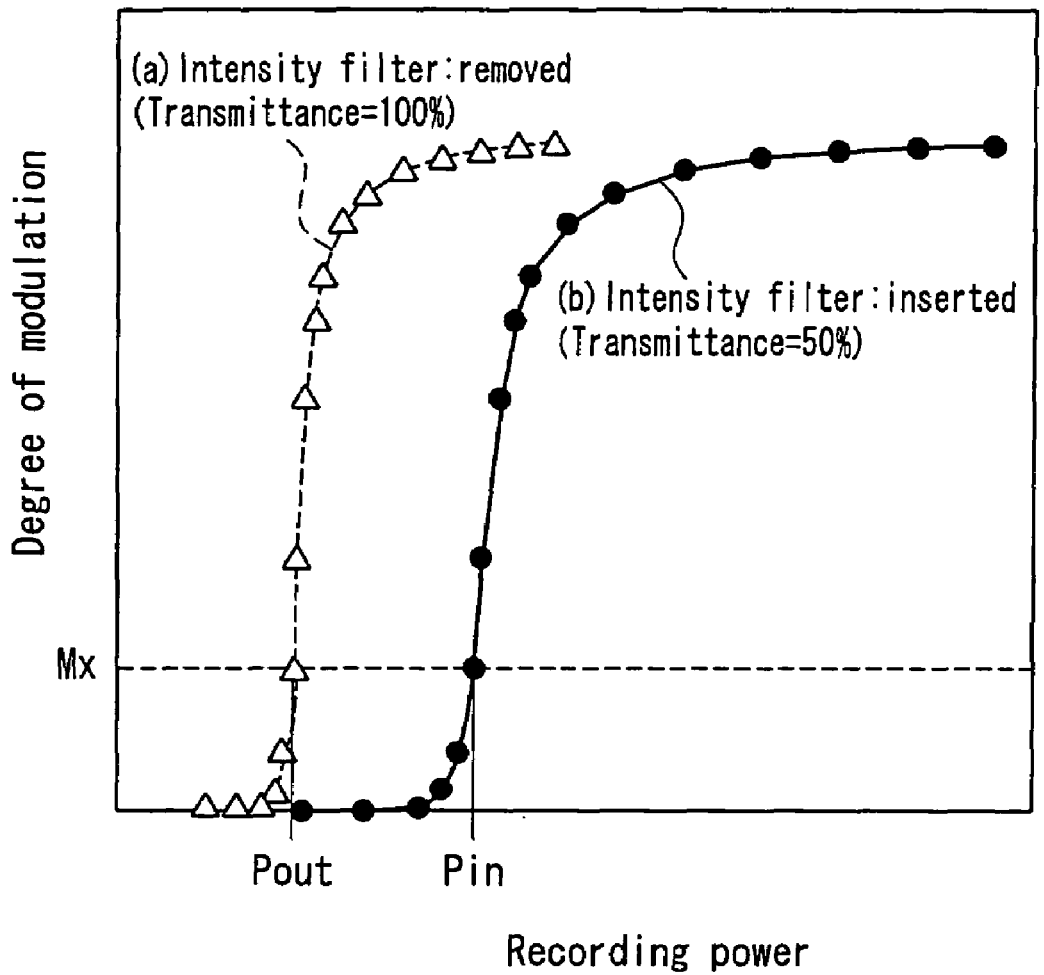
FIG. 17 is a graph showing an example of recording power-modulation degree characteristics of the semiconductor laser of the optical recording/reproducing apparatus according to the present invention.
Figure 18:
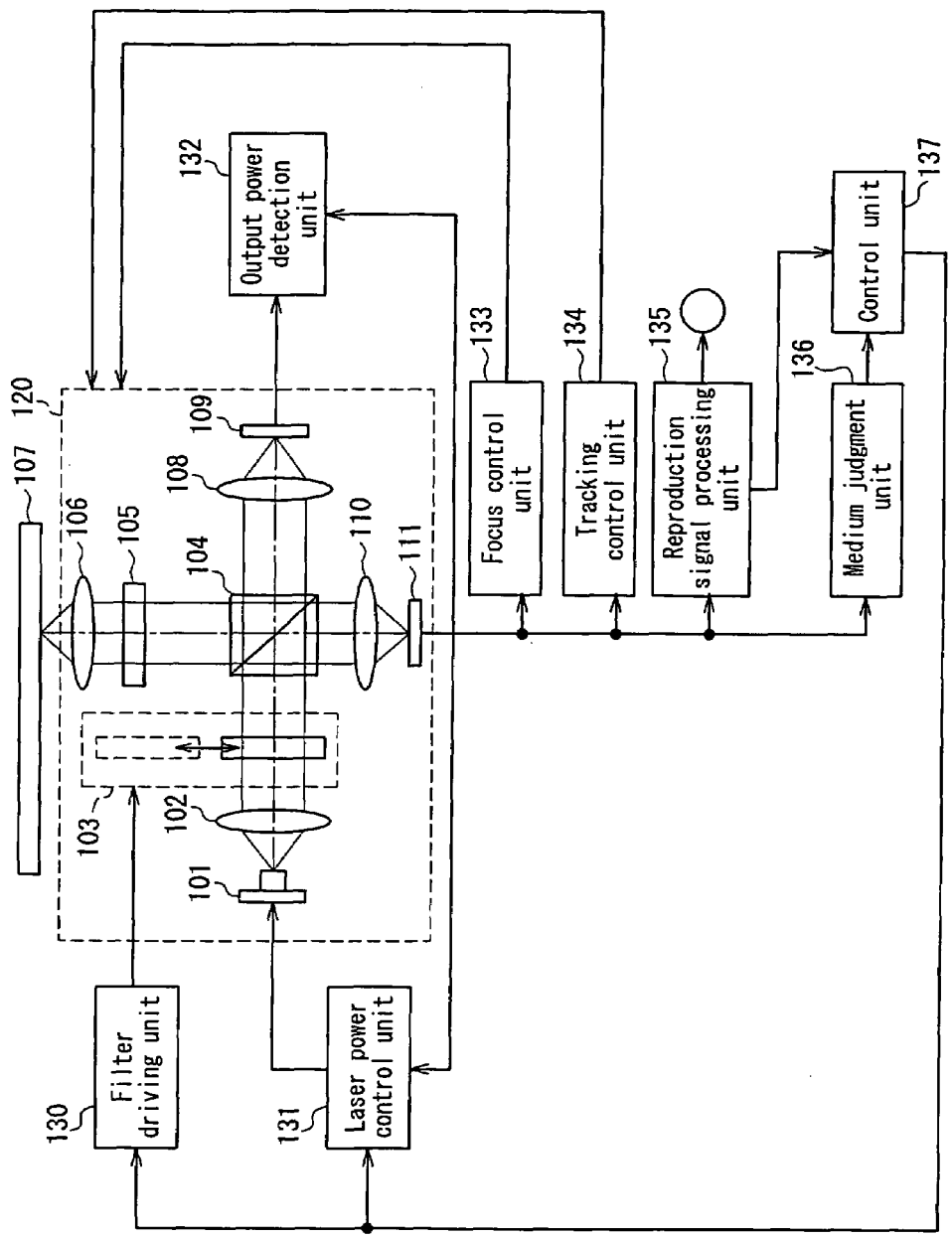
FIG. 18 is a block diagram showing a configuration of an optical recording/reproducing apparatus according to a second conventional example.
Figure 19:
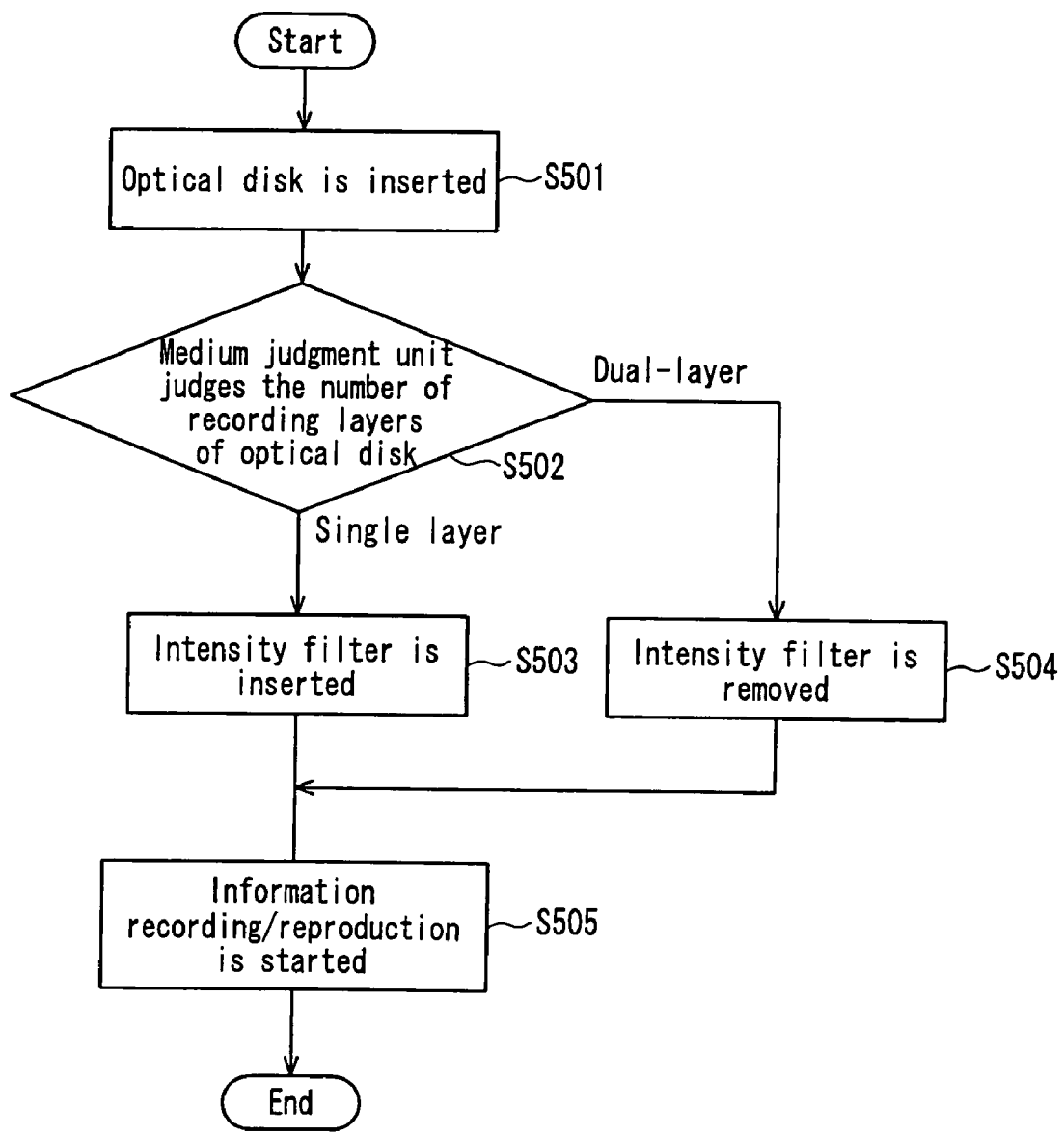
FIG. 19 is a flow chart showing an exemplary starting procedure for the optical recording/reproducing apparatus according to the second conventional example.
Figure 20A:
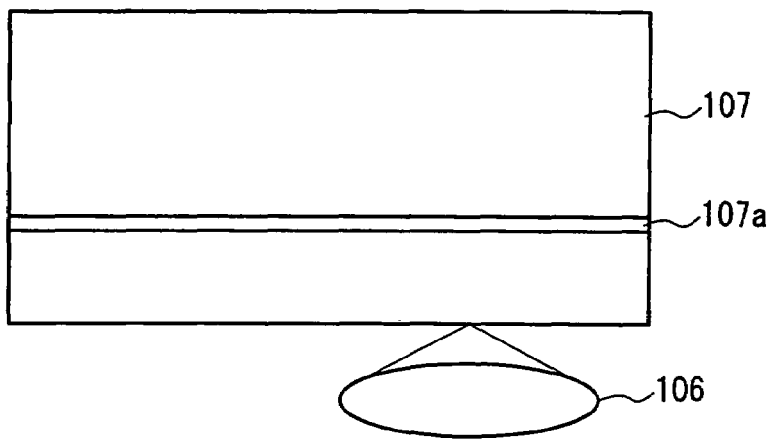
FIG. 20 is a cross-sectional view showing exemplary configurations of optical disks.
Figure 20B:
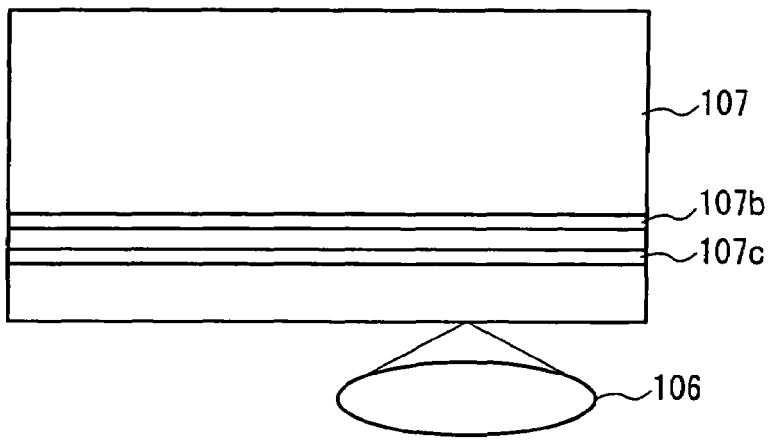

FIG. 17 is a graph showing an example of recording power—modulation degree characteristics of the semiconductor laser of the optical recording/reproducing apparatus according to the present invention. In FIG. 17, an X axis indicates the transition of the recording power directed onto the optical disk, and a Y axis indicates the transition of the degree of modulation. When a recording power Pin that allows a degree of modulation Mx to be achieved in the case of the intensity filter being inserted in the optical path and a recording power Pout that allows the degree of modulation Mx to be achieved in the case of the intensity filter being removed from the optical path satisfy the relationship expressed by the following Formula (22), for example, the control unit judges that the intensity filter and the filter driving unit are operated normally.

$$0.4 \times Pin < Pout < 0.6 \times Pin \qquad \text{Formula (22)}$$

As described above, it is possible to judge the operation state of the transmission amount variation unit (intensity filter and the filter driving unit) by using as the characteristic value the recording power detected by the output power detection unit (characteristic detection unit) via the light-receiving element (photodetector). In the case where the recording power is used as the characteristic value as described above, the judgment unit can judge whether or not the transmission amount variation unit is operated in accordance with the control signal from the transmission amount control unit even during an information recording operation with respect to a recording medium. The coefficients ("0.4" and "0.6") in the Formula (22) are not limited thereto, as long as detection variations in the recording powers Pout and Pin can be eliminated.

Similarly, by using as the characteristic value the reproduction power that can be detected by the output power detection unit (characteristic detection unit) via the light-receiving element (photodetector), it is also possible to judge whether or not the transmission amount variation unit (intensity filter and the filter driving unit) is operated normally based on the same formula. In the case where the reproduction power is used as the characteristic value, the judgment unit can judge whether or not the transmission amount variation unit is operated in accordance with the control signal from the transmission amount control unit even during an information reproducing operation with respect to the recording medium.

In each of the above-described embodiments, the judgment as to the operation state of the intensity filter and the filter driving unit is made when the optical recording/reproducing apparatus is started. However, the present invention is not limited thereto. For example, a malfunction of the intensity filter and the filter driving unit may be detected during a recording operation. This can prevent deterioration or destruction of the semiconductor laser even when a malfunction of the intensity filter and the filter driving unit occurs during a recording operation.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An optical recording/reproducing apparatus for recording or reproducing information on/from a recording medium, comprising:
   a laser light source;
   an optical output control unit for controlling an output of a laser beam emitted from the laser light source;
   a photodetector that is capable of receiving the laser beam from the laser light source and outputs an electronic signal in accordance with the received laser beam;
   a beam splitter for separating the laser beam from the laser light source into a first laser beam to be directed onto the photodetector and a second laser beam to be directed onto the recording medium;
   a transmission amount variation unit for adjusting a transmission amount of the laser beam from the laser light source;
   a transmission amount control unit for controlling the transmission amount variation unit;
   a characteristic detection unit for detecting a characteristic value of the first laser beam when the photodetector receives the first laser beam; and
   a judgment unit for judging whether or not the transmission amount variation unit is operated in accordance with a control signal output from the transmission amount control unit by using the characteristic value from the characteristic detection unit,
   wherein the judgment unit performs error processing when the judgment unit judges the transmission amount variation unit is not operated in accordance with the control signal output from the transmission amount control unit.

2. The optical recording/reproducing apparatus according to claim 1, wherein the transmission amount variation unit includes a first transmission amount variation unit for adjusting the transmission amount of the laser beam from the laser light source in accordance with the number of recording layers or recording sensitivity of the recording medium and a second transmission amount variation unit for adjusting the transmission amount of the laser beam from the laser light source in accordance with a reproducing operation or a recording operation with respect to the recording medium.

3. The optical recording/reproducing apparatus according to claim 1, wherein the transmission amount control unit outputs at least two different kinds of control signals to the transmission amount variation unit, so that an operation state of the transmission amount variation unit is switched between at least two modes.

4. The optical recording/reproducing apparatus according to claim 3, wherein
   when at least the two different kinds of control signals are output to the transmission amount variation unit, and the characteristic detection unit detects a first characteristic value E1 and a second characteristic value E2,
   the judgment unit judges whether or not the first characteristic value E1, the second characteristic value E2, and laser optical transmittance m of the transmission amount variation unit satisfy following relationship, so as to judge whether or not the transmission amount variation unit is operated in accordance with the control signals output from the transmission amount control unit:

$$K1 \times m \times E2 < E1 < K2 \times m \times E2$$

(where K1 and K2 are coefficients).

5. The optical recording/reproducing apparatus according to claim 1, comprising a storage unit for storing a reference characteristic value as a set characteristic value beforehand,
   wherein the judgment unit judges whether or not the transmission amount variation unit is operated in accordance with the control signal output from the transmission amount control unit based on the characteristic value from the characteristic detection unit and the set characteristic value from the storage unit.

6. The optical recording/reproducing apparatus according to claim 1, wherein the characteristic detection unit detects as the characteristic value at least one of an optical output of the first laser beam obtained from the electronic signal output from the photodetector and a current supplied to the laser light source obtained from the output signal output from the optical output control unit.

7. The optical recording/reproducing apparatus according to claim 1, wherein the characteristic detection unit detects as the characteristic value a differential quantum efficiency value of the first laser beam based on an optical output of the first laser beam obtained from the electronic signal output from the photodetector and a current supplied to the laser light source obtained from the output signal output from the optical output control unit.

8. The optical recording/reproducing apparatus according claim 1, wherein the characteristic detection unit detects as the characteristic value a power of the first laser beam during a reproducing operation with respect to the recording medium.

9. The optical recording/reproducing apparatus according to claim 1, wherein the characteristic detection unit detects as the characteristic value a power of the first laser beam during a recording operation with respect to the recording medium.

10. The optical recording/reproducing apparatus according to claim 1, wherein the judgment unit judges whether or not the transmission amount variation unit is operated in accordance with the control signal output from the transmission amount control unit in a state where the second laser beam is prevented from being converged on the recording medium.

11. The optical recording/reproducing apparatus according to claim 10, further comprising a light-shielding unit that is inserted between the beam splitter and the recording medium so as to prevent the second laser beam from being converged on the recording medium.

12. The optical recording/reproducing apparatus according to claim 10, further comprising:
- an objective lens for converging the second laser beam on the recording medium; and
- a focus control unit for controlling a position of the objective lens perpendicularly to the recording medium,
- wherein the focus control unit controls the position of the objective lens so as to prevent the second laser beam from being focused on the recording medium during the judgment by the judgment unit.

13. The optical recording/reproducing apparatus according to claim 1, wherein the transmission amount variation unit includes an optical filter that is inserted in or removed from a space between the laser light source and the beam splitter.

14. The optical recording/reproducing apparatus according to claim 1, wherein the transmission amount variation unit includes a liquid crystal element.

15. The optical recording/reproducing apparatus according to claim 1, wherein the error processing is selected from the group consisting of:
1) the judgment unit notifies a host device of the error;
2) the judgment unit instructs the optical output control unit to stop supplying a current to the laser light source;
3) reproducing information is stopped; and
4) recording information is stopped.

* * * * *